United States Patent [19]

Tkacenko

[11] 3,812,286

[45] May 21, 1974

[54] ROTARY SPECIAL EFFECTS GENERATOR

[75] Inventor: Nikola B. Tkacenko, Auburn, Calif.

[73] Assignee: Sarkes Tarzian, Inc., Bloomington, Ind.

[22] Filed: Apr. 5, 1971

[21] Appl. No.: 131,300

[52] U.S. Cl. .............................. 178/6.8, 178/DIG. 6
[51] Int. Cl. .............................. H04m 5/22
[58] Field of Search .................. 178/DIG. 6, 6.8, 7.2

[56] References Cited

UNITED STATES PATENTS

| | | | |
|---|---|---|---|
| 3,371,160 | 2/1968 | Hurford | 178/DIG. 6 |
| 3,006,993 | 10/1961 | Barndt | 178/6 |
| 2,244,239 | 6/1941 | Blumlein | 178/DIG. 6 |

OTHER PUBLICATIONS

Glasford–Fundamentals of Television Engineering, pg. 505, McGraw–Hill Book Company, 1955.

*Primary Examiner*—Robert L. Griffin
*Assistant Examiner*—Joseph A. Orsino, Jr.
*Attorney, Agent, or Firm*—Mason, Kolehmainen, Rathburn & Wyss

[57] ABSTRACT

A special effects generator for use in video switching produces a wide variety of rotational wipes, fades, and special effects. The generator functions by mixing together controlled amounts of horizontal and vertical sawtooth waveforms and DC potentials. The resultant signal is then fed into a comparator, and the comparator output is used to control one or more electronic video switches. The special effects are controlled by varying the strengths of the waveforms which are summed through the use of potentiometers or variable resistors. Rotational special effects are achieved through the use of a 360 degree circular potentiometer having multiple taps. Provision is made for multiple image special effects. Also disclosed are circuits for preserving the integrity of the switch output signal during synchronizing intervals and for equalizing the DC levels of all the video signals which are mixed together.

23 Claims, 21 Drawing Figures

Inventor:
Nikola Tkacenko
By:
Mason, Kolehmainen, Rathburn & Wyss
Attys.

ROTARY SPECIAL EFFECTS GENERATOR

The present invention relates to special effect generators for television, and more particularly to a mechanism for generating rotational special effects of various types.

At the present time, a wide variety of special effects generators are being used by television stations and by others. The simplest type of special effects generator allows one to "fade" one video image into another through the use of ganged potentiometers. A more sophisticated form of special effects generator allows one video image to "wipe" another off the screen. The two video images are always separated by a straight line, and the line moves straight across the screen from one side to the other, from top to bottom, or else diagonally along a straight line path. A more sophisticated form of special effects generator allows a square or rectangular segment of one video image to be cut away and replaced with a portion of a second video image. None of these conventional special effects generators is capable of generating a split image in which the line that separates two video images can rotate along a circular path in the manner of a windshield wiper or about a fixed point in the manner of an airplane propeller.

A primary object of the present invention is the production of a special effects generator which allows a variety of circular wipes, fades, and special effects to be generated.

Another object of the invention is to equip such a generator with a single control lever that can be used to generate a variety of different circular wipe effects each having a unique center of rotation for the wipe.

A further object of the invention is to provide such a special effect generator with a knob which may be rotated continuously so as to cause the line or lines which separate two or more images to rotate continuously about some arbitrary point of reference.

An additional object of the invention is to provide a single, compact special effects generator that can produce many different types of circular wipes, fades, and effects.

Yet another object of the invention is the production of a generator which does not interfere with synchronization signals and which preserves the DC integrity of all signals which it is called upon to process.

In accordance with these and many other objects, an embodiment of the present invention comprises briefly a special effects generator having a rotational control which may be rotated continuously, a wipe control which may be moved from one extreme position to another, or both. The generator additionally may include a plurality of push buttons which allow the selection of any one from a wide variety of rotational special effects, wipes, and fades.

The rotational control may comprise a 360° circular potentiometer having taps at 0°, 90°, 180°, and 270°. Non-inverted and inverted vertical sawtooth signals are applied to one pair of 180° opposing taps, and non-inverted and inverted horizontal sawtooth waveforms are applied to the other pair of 180° opposing taps. The circular potentiometer may have one movable tap the output of which is fed to a comparator. The output of the comparator may then be used to control video switching between two signals. The resultant arrangement produces a composite of the two video images separated by a straight line which always passes through a fixed reference point. When the potentiometer is rotated, the straight line rotates in the same manner as the potentiometer and thus produces an interesting double-image rotational effect. A variant of the above arrangement includes a second potentiometer movable tap mounted 90° away from the first movable tap and connected to a second comparator. Through the use of appropriate gating logic, the outputs of the two comparators may be used to control the assembly of portions of four video images into a single image in which fragments of the four images are separated by a cross or X which rotates as the potentiometer taps are rotated.

The wipe control may be a potentiometer that is analogous to one-quarter or one-half of the 360° potentiometer mentioned above, or it may be a control for some form of multi-signal mixing circuit—for example, a mixing circuit constructed from light sensitive resistors whose resistance is controlled by varying the amount of illumination to which the resistors are subjected. Differing types of wipes may be obtained by mixing together two or three different horizontal and vertical sawtooth signals and DC potentials. If two signals are used, one is a non-inverted or an inverted horizontal sawtooth waveform and the other is a non-inverted or an inverted vertical sawtooth waveform; and either may be supplemented by a DC bias so as to shift the resultant center of rotation. If three signals are used, two of the signals are normal and inverted horizontal or vertical sawtooth waveforms and the remaining signal is a sawtooth waveform of the other type (horizontal or vertical). Again, any of the three signals may be supplemented by a DC bias so as to shift the resultant center of rotation. By using the proper combination of such signals, "windshield wiper" wipes of one image into another may be achieved with the center of rotation of the windshield wiper positioned at any corner of the video image or at the center of any edge of the video image. The above effects may be achieved with the use of a single comparator controlling video switches for two signals. If two comparators are used, it is also possible to achieve a centrally positioned rotational wipe in which one video image unfolds over another exactly as two folding fans may be unfolded over an image if their centers are placed at the center of the image, if they are initially positioned along a straight line, and if they are both unfolded in the same direction at the same rate (e.g. : clockwise).

The invention also contemplates preserving the integrity of the various video synchronizing signals by assuring that no video switching occurs during a synchronization pulse or during the color burst interval. The invention also equalizes the black levels of all video signals which are mixed and thus eliminates any troublesome switching transients which might otherwise arise.

Further objects and advantages of the present invention are apparent in the detailed description which follows, and the points of novelty which characterize the invention are pointed out with particularity in the claims annexed to and forming a part of the specification.

For a better understanding of the present invention, reference will be made to the drawings wherein.

Figures 1, 2, 3:
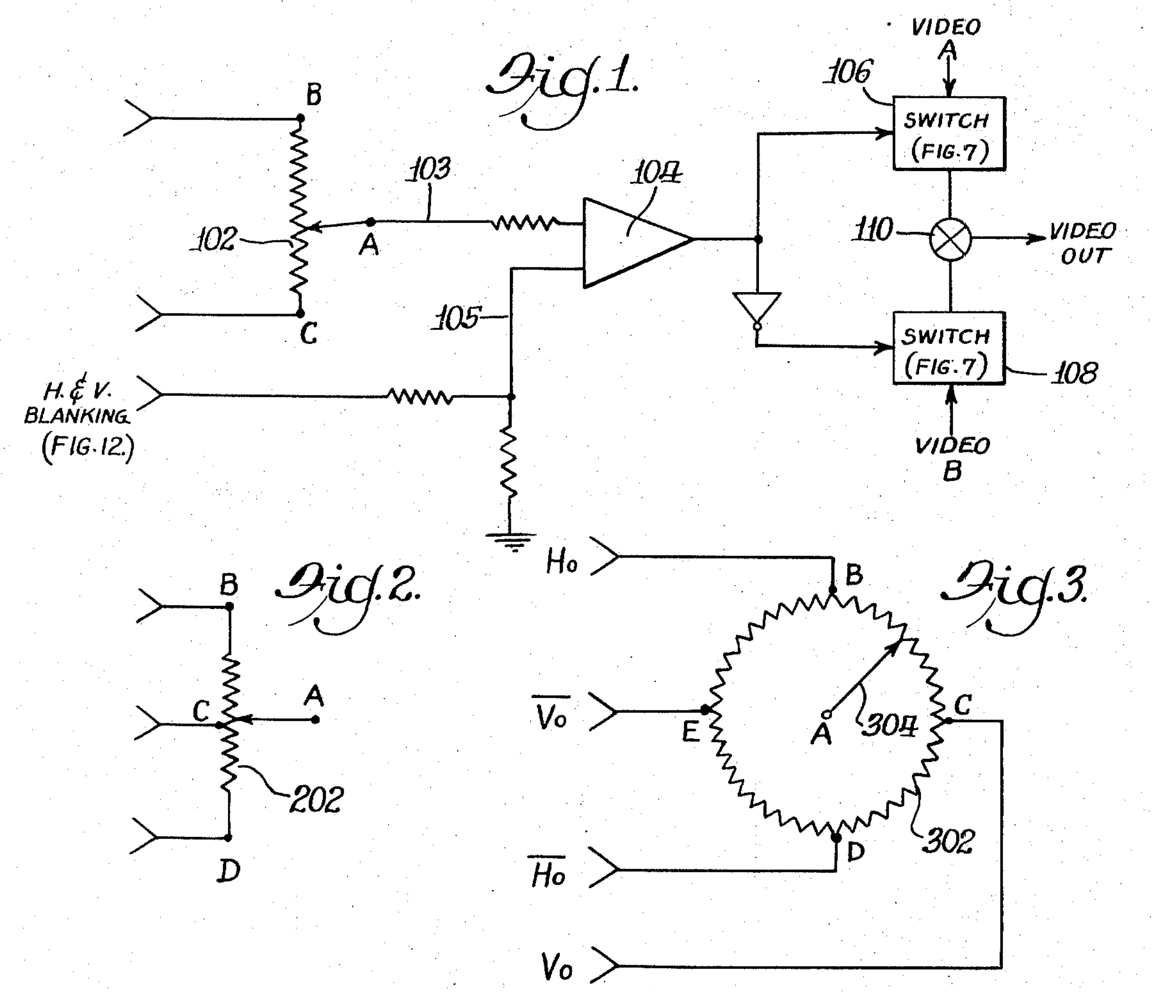
FIG. 1 is a block diagram of a simple 90° wipe generator designed in accordance with the present invention.
FIG. 2 illustrates a potentiometer which adapts the circuit shown in FIG. 1 to perform 180° rotational wipes.
FIG. 3 is a circuit diagram of a rotary potentiometer designed to produce a 360° rotational special effects when used with the circuitry shown in FIG. 1.
Figure 4:
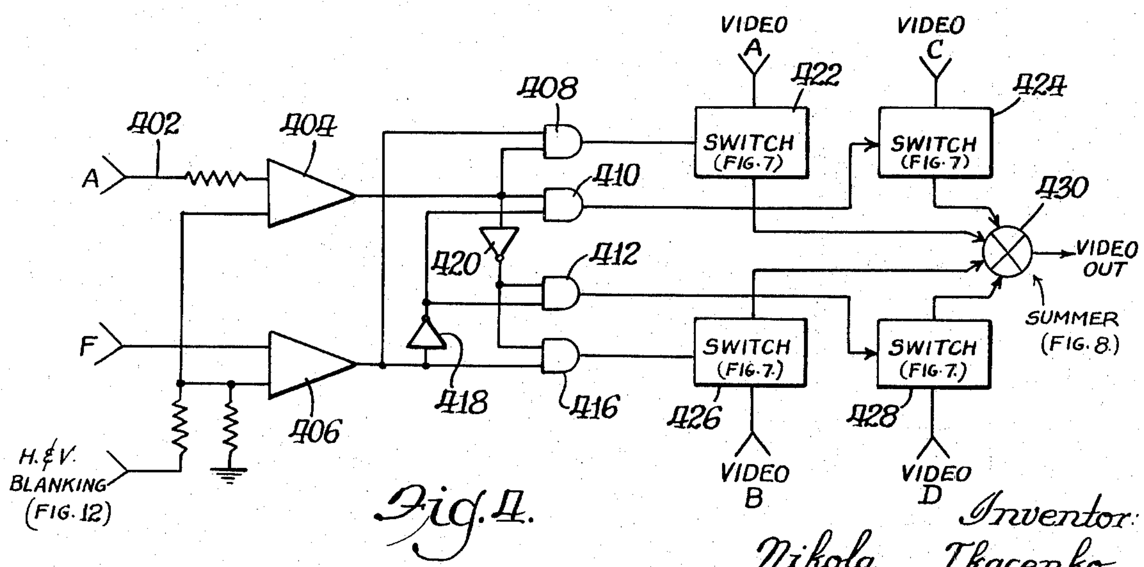
FIG. 4 is a more sophisticated version of the circuitry shown in FIG. 1 designed to handle four video signals and to produce more complex special effects.
Figure 15:
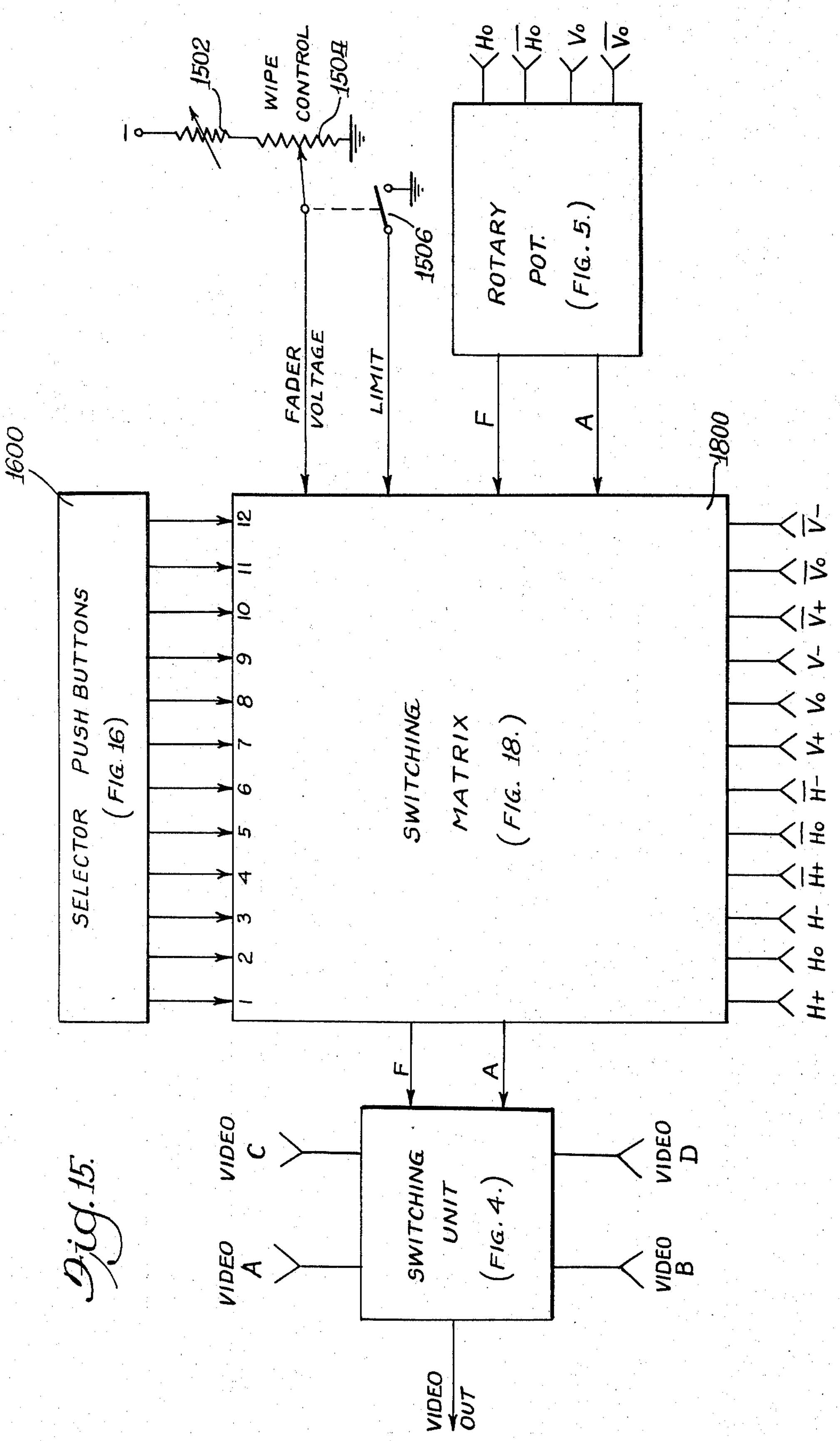
FIG. 15 is a block diagram of the preferred embodiment of the present invention.
Figure 18A:
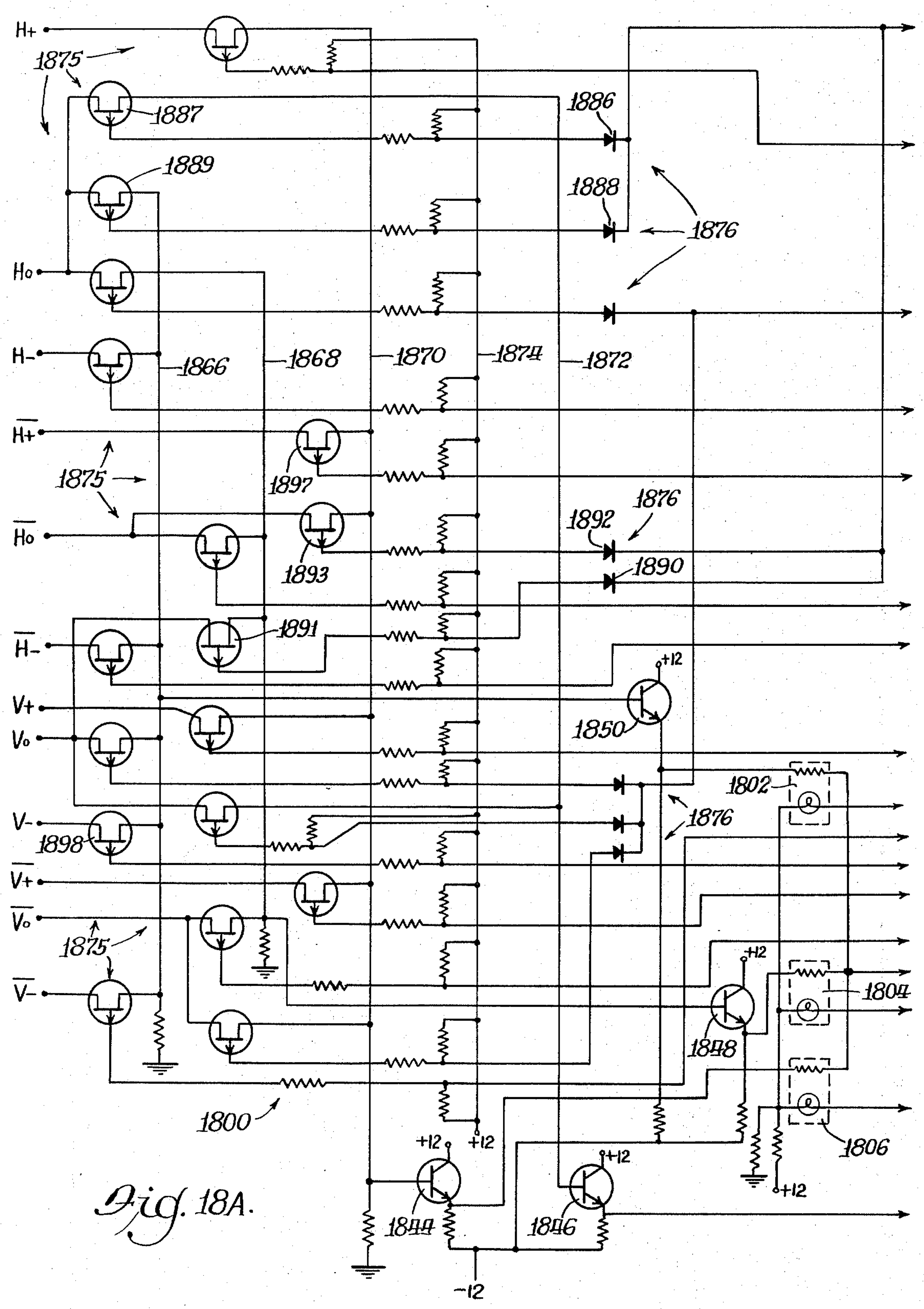
Figure 18B:
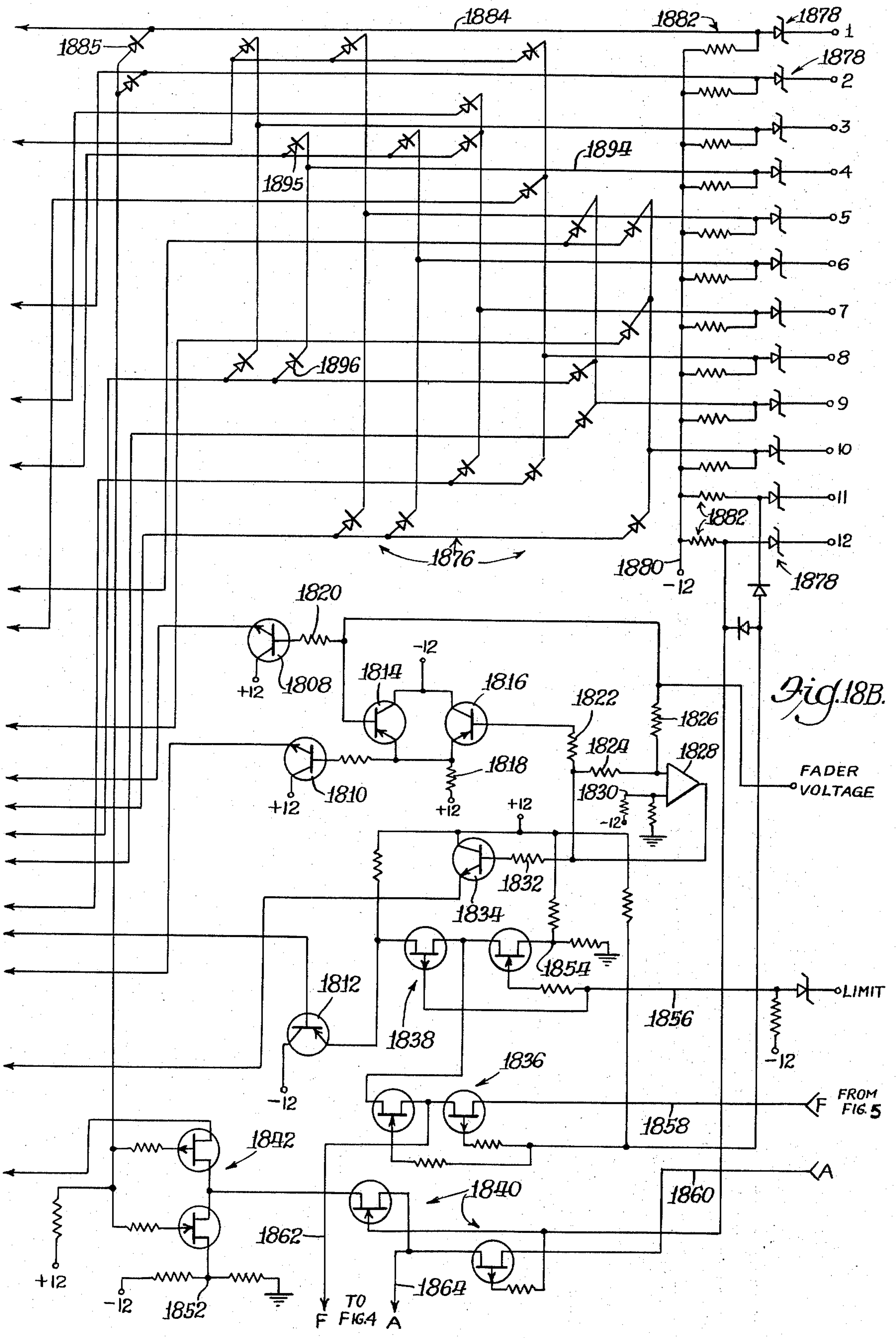
Figure 19:
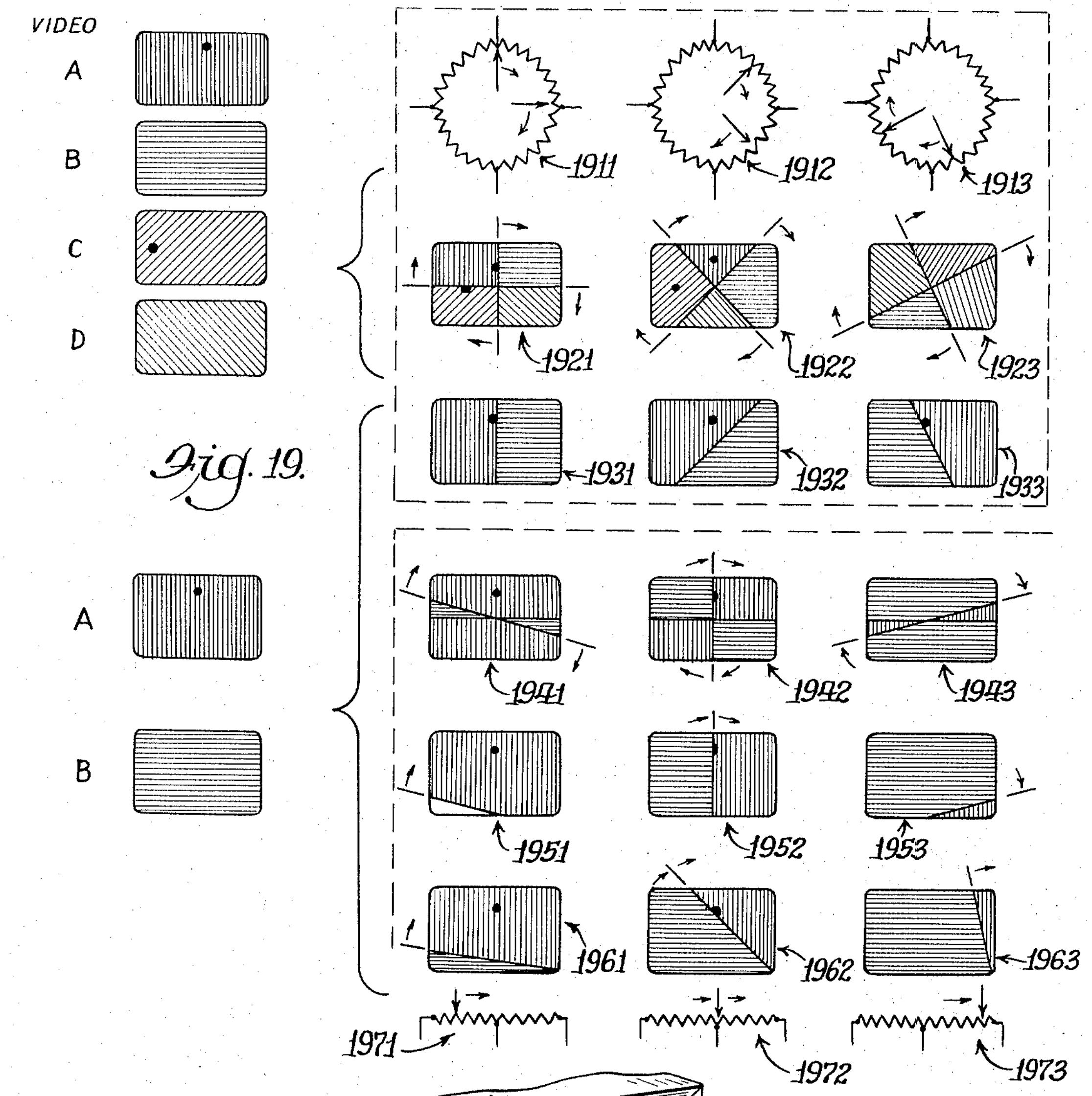
Figure 20:
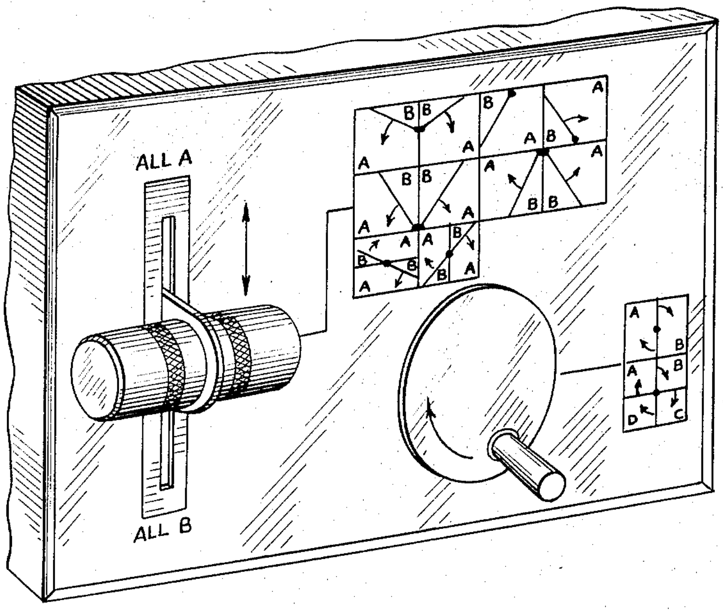

FIGS. 18A and 18B together form a complete schematic diagram of the switching matrix shown diagramatically in FIG. 15;

FIG. 19 illustrates a few of the various special effects which may be achieved using the generators shown in FIGS. 1, 4, and 15; and FIG. 20 illustrates a suitable front panel design for the generator shown in FIG. 15.

The simplest embodiment of the present invention is shown in FIG. 1. This embodiment is capable of producing a 90° wipe effect, such as that shown at 1961, 1962, and 1963 in FIG. 19, or to produce a 90° about-center rotation effect such as that illustrated in FIGS. 1931 and 1932 in FIG. 19. The particular effect which is generated depends on what waveforms from those shown in FIG. 6 are applied to the simple potentiometer 102 (FIG. 1).

To understand the fundamental principle underlying the present invention, assume that the waveform $H_0$ (horizontal sweep sawtooth—see FIG. 6) is applied to terminal B of the potentiometer 102, and that the waveform $V_0$ (vertical sweep sawtooth—see FIG. 6) is applied to terminal C of the potentiometer 102. Assume further that the slider A of the potentiometer 102 is positioned adjacent the terminal B so that the waveform $H_0$ is applied to an input 103 of a comparator 104. For the moment, the other input 105 to the comparator 104 may be assumed to be grounded. The output of the comparator 104 is applied directly to a video switch 106 and in inverted form to a video switch 108 and thus determines which of the two signals VIDEO A or VIDEO B passes through a summer 110 and becomes a signal VIDEO OUT. With the slider of the potentiometer 102 adjcent to terminal B, reference to FIG. 6 indicates that the potential of the terminal 103 changes from negative to positive at the mid-point of each horizontal sweep interval. Hence, at exactly the mid-point of each horizontal sweep the circuitry shown in FIG. 1 switches the signal VIDEO OUT from VIDEO A to VIDEO B or vice versa. The resultant VIDEO OUT signal includes half of the signal VIDEO A and half of the signal VIDEO B with the two signals separated by a vertical line that passes through the center of the resultant video image.

Figure 6:
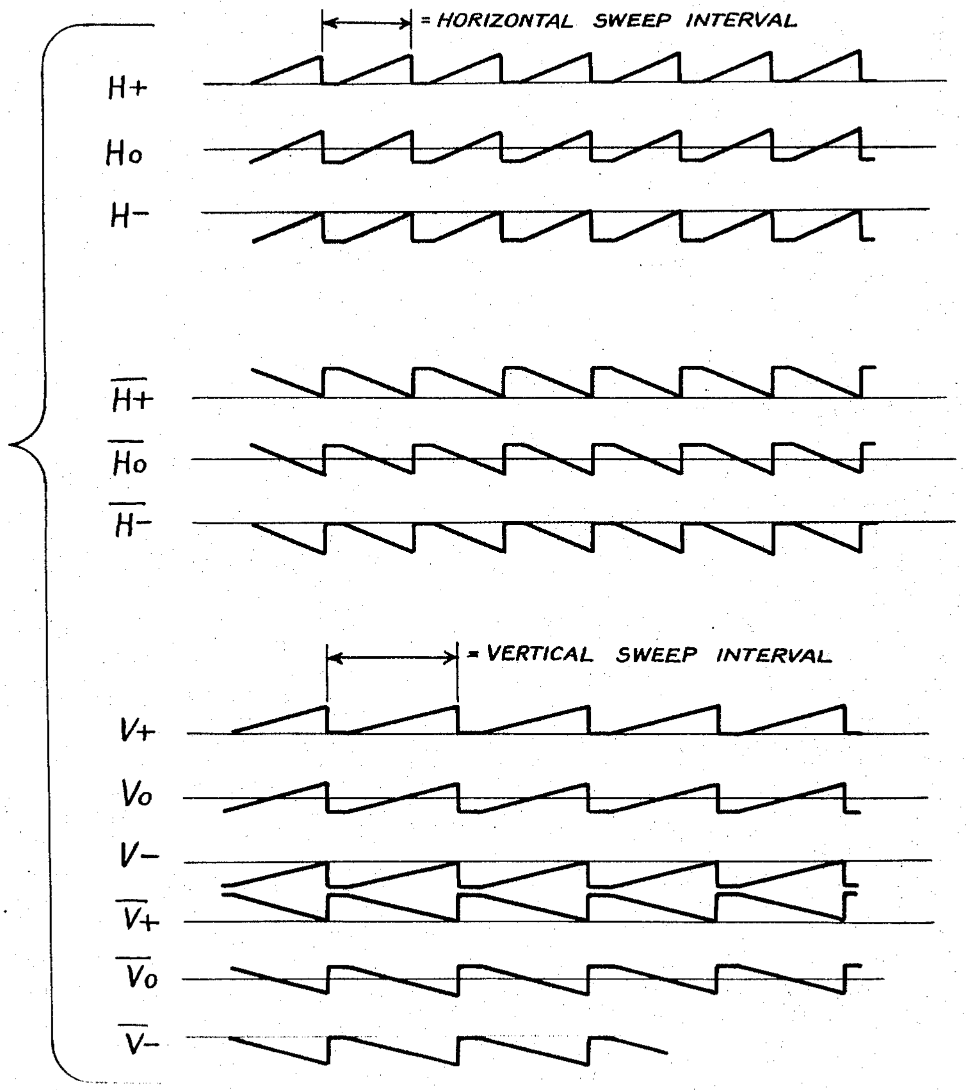
FIG. 6 illustrates a variety of the various sawtooth waveforms which may be used in carrying out the present invention.

Assume now that the slider A of the potentiometer 102 is adjacent the terminal C so that the input 103 to the comparator 104 is receiving the signal $V_0$ shown in FIG. 6. The signal $V_0$ is a vertical sawtooth waveform which passes through zero volts at the mid-point of each vertical sweep. This waveform causes the comparator 104 to shift the VIDEO OUT signal from VIDEO A to VIDEO B (or vice versa) exactly half-way through each vertical sweep. The resultant VIDEO OUT signal is comprised one half of the VIDEO A signal and one half of VIDEO B signal, and the two signals are separated by a horizontal line which passes through the middle of the resultant image.

Assume now that the slider A on the potentiometer 102 is moved slowly from a position adjacent the terminal C towards a position adjacent the terminal B. As the slider A moves away from the terminal C, a small component of the signal $H_0$ appears superimposed upon the signal $V_0$. Since the horizontal waveform fluctuates approximately 15,000 times for each fluctuation of the vertical waveform, this horizontal sawtooth "disturbance" of the $V_0$ waveform causes the appearance of multiple zero crossings and thus multiple switchings between the signals VIDEO A and VIDEO B towards the center of the picture. At times when the $V_0$ waveform is somewhat negative, the $H_0$ fluctuation produces zero crossings adjacent the right-hand end of each horizontal sweep. When the $V_0$ waveform is approximately at zero potential, the $H_0$ waveform fluctuations cause zero crossings at the center of each horizontal sweep. As the $V_0$ waveform swings positive, and thus as the video sweep passes below the center of the picture, the $H_0$ fluctuations cause the zero crossings to move towards the left-hand edge of each horizontal sweep. The result of these horizontal zero crossings is an effective rotation of the originally horizontal separation between the images A and B. Hence, as the slider A is moved upwards away from the terminal C, the horizontal line separating the VIDEO A half of the VIDEO OUT signal from the VIDEO B half tends to rotate in a counter-clockwise direction about the center of the picture.

This rotation continues as the slider A is moved upwards. When the slider A reaches the center of the potentiometer 102, the resultant equal mixture of horizontal and vertical waveforms $H_0$ and $V_0$ produces a resultant image in which a diagonal line cutting through the center of the VIDEO OUT image at an angle of 45° separates images A and B from one another. As the slider A approaches the terminal B of the potentiometer 102, the waveform reaching the comparator 104 becomes essentially an $H_O$ waveform with a small vertical slant—enough to cause a slight clockwise rotation of an essentially vertical line separating the images A and B. In this manner, a complete 90° rotational effect is achieved in the VIDEO OUT signal when the slider A of the potentiometer 102 is moved from position C to position B. This effect is illustrated at 1931 and 1932 in FIG. 19.

In the above description, it was assumed that the potentiometer 102 was connected between portions of the signals $H_O$ and $V_O$ (FIG. 6) both of which pass through zero volts at the center of their respective sweeps. The resultant rotational effect is a 90° rotation of a line about the center of the composite vide image. The wipe effect illustrated at 1961, 1962, and 1963 in FIG. 19 may be achieved by the same simple circuit if appropriate DC biases are added to the $H_O$ and $V_O$ waveforms so as to bias the center of the rotation away from the center of the image and towards one or the other of the four corners of the image. As an example, if the waveform $V_-$ (FIG. 6) is used in place of the waveform $V_O$ and if the waveform $H_+$ is used in place of the waveform $H_O$, the resultant wipe is as shown at 1961, 1962, and 1963 in FIG. 19. The position of the slider on the potentiometer 102 is as shown at 1971, 1972, and 1973 in FIG. 19 (ignoring the center tap). Other similar corner wipe effects may be achieved by choosing other appropriate combinations of the waveform shown in FIG. 6. The circuit shown in FIG. 1 is capable of producing any desired type of 90° rotational wipe effect or special effect.

A 180° wipe or special effect is achieved by combining two successive 90° wipes such as that described above. This may be done simply by replacing the potentiometer 102 with a new potentiometer 202 (FIG. 2) having a center tap. The upper terminal B and the center tap C of the potentiometer 202 are connected to the waveforms shown in FIG. 6 in exactly the same manner as were the corresponding terminals B and C of the potentiometer 102 shown in FIG. 1. A 90° rotation or wipe effect is achieved when the slider A is moved from B to C. The terminal D of the potentiometer 202 is supplied with the mirror image or inverse of the waveform supplied to terminal B. In effect, this allows the lower half of the potentiometer 202 to generate a second 90° rotation. When connected into the circuitry shown in FIG. 1, the potentiometer 202 may be used to generate a 180° rotation as shown at 1931, 1932, and 1933 in FIG. 19. If the signal supplied to terminals B and D of the potentiometer 202 are biased either positively or negatively, a 180° wipe effect as shown at 1951, 1952, and 1953 in FIG. 19 may be achieved using the potentiometer settings indicated at 1971, 1972, and 1973. Hence, the potentiometer arrangement shown in FIG. 2 may be used to generate any desired 180° rotational wipe or special effect.

As a simple extension of the above concept, four successive 90° rotations may be carried out by one circular potentiometer designed as shown in FIG. 3. A potentiometer 302 is circular in shape and has no beginning or end, but has four taps spaced 90° apart from one another. The two taps B and D are respectively supplied with the horizontal sweep waveform $H_O$ and with an inverse horizontal sweep waveform $\bar{H}_O$. The remaining two oppositely facing taps C and D are respectively supplied with the vertical sawtooth waveform $V_O$ and with an inverse of the waveform $\bar{V}_O$. When the potentiometer 302 is connected into the circuit shown in FIG. 1 in place of the potentiometer 103, a continuous rotational effect is achieved as indicated at 1931, 1932, and 1933 in FIG. 19. The corresponding positions of the slider within the potentiometer 302 is as indicated at 1911, 1912, and 1913 (for purposes of this discussion, one of the wiper arms shown in 1911, 1912, and 1913 may be ignored). The resultant effect is that of a line continuously rotating about the center of the video image. On one side of the line is a portion of the VIDEO A image, and on the other side of the line is a portion of the VIDEO B signal. The rotation of the line is controlled by rotation of the potentiometer 302. If a constant speed, variable speed, or high speed rotation is desired, the slider 304 of the potentiometer 302 may be equipped with a motor and any suitable form of motor control circuitry.

The circuit shown in FIGS. 1, 2, and 3 may achieve any form of rotational wipe or rotational special effect involving two video images and in which the images are separated by a line that rotates about a point. In FIG. 4, the basic concepts discussed above are extended to an arrangement which can handle four different video signals and which produces the interesting rotational effect shown at 1921, 1922, and 1923 in FIG. 19. Four quarter sections of four different video images A, B, C, and D are always visible, and the sections rotate as a potentiometer 502 (FIG. 5) is rotated. The position of the potentiometer 502 required to produce various effects is shown at 1911, 1912, and 1913 in FIG. 19. A first slider 504 of the potentiometer 502 (FIG. 5) acts with a first comparator 404 in exactly the manner described above. The output of the comparator 404 thus defines a line which essentially divides the resultant image in half along a diagonal line. The potentiometer 502 also includes a second slider 506 that is mounted 90° away from the slider 504. The slider 506 is connected to a second comparator 406 (FIG. 6) in the manner described above. The slider 506 and comparator 406 combine to define an image separation line which is perpendicular to the line defined by the slider 504 and the comparator 404. As the sliders of the potentiometer 502 are rotated, the two lines rotate as well. The four possible output states of the comparators 404 and 406 (both outputs low, one high and the other low, one low and the other high, and both outputs high) uniquely define time intervals during which only one of the four video signals VIDEO A, VIDEO B, VIDEO C, and VIDEO D become part of the VIDEO OUT signal. In this manner, a quarter section of each inout signal is continuously displayed as is shown at 1921, 1922, and 1923 in FIG. 19. Logical gates 408, 410, 412, 416, 418 and 420 convert the two output signals of the comparators 404 and 406 into four control signals for the four video switches 422, 424, 426, and 428 in accordance with the following table:

| 404 output | 406 output | Switch Enabled |
|---|---|---|
| Low | Low | 428 |
| Low | High | 426 |
| High | Low | 424 |
| High | High | 422 |

The outputs of the four video switches are then combined by a summer 430 to form the VIDEO OUT signal.

Figure 10:
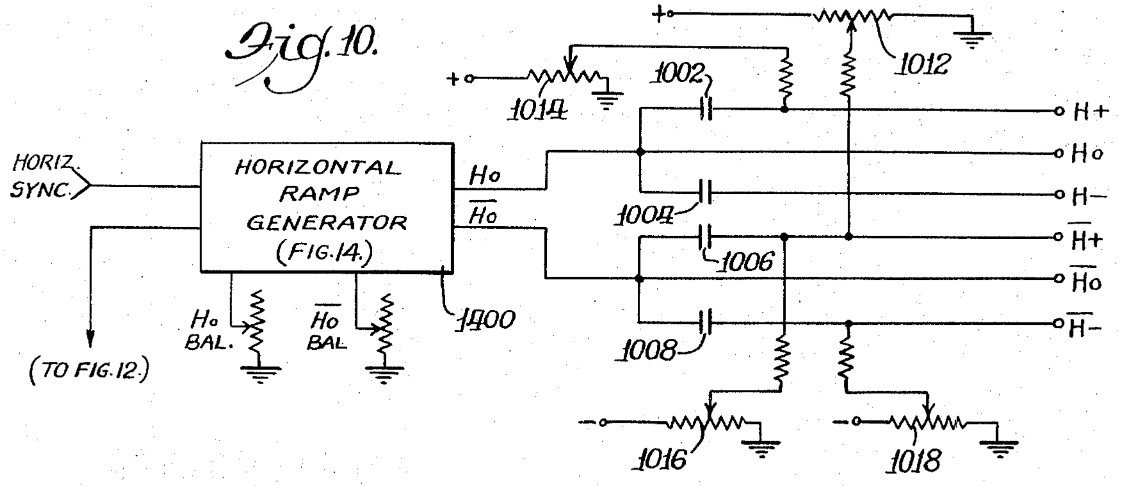
FIG. 10 illustrates how the horizontal sawtooth waveforms shown in FIG. 6 are generated.
Figures 11, 12:
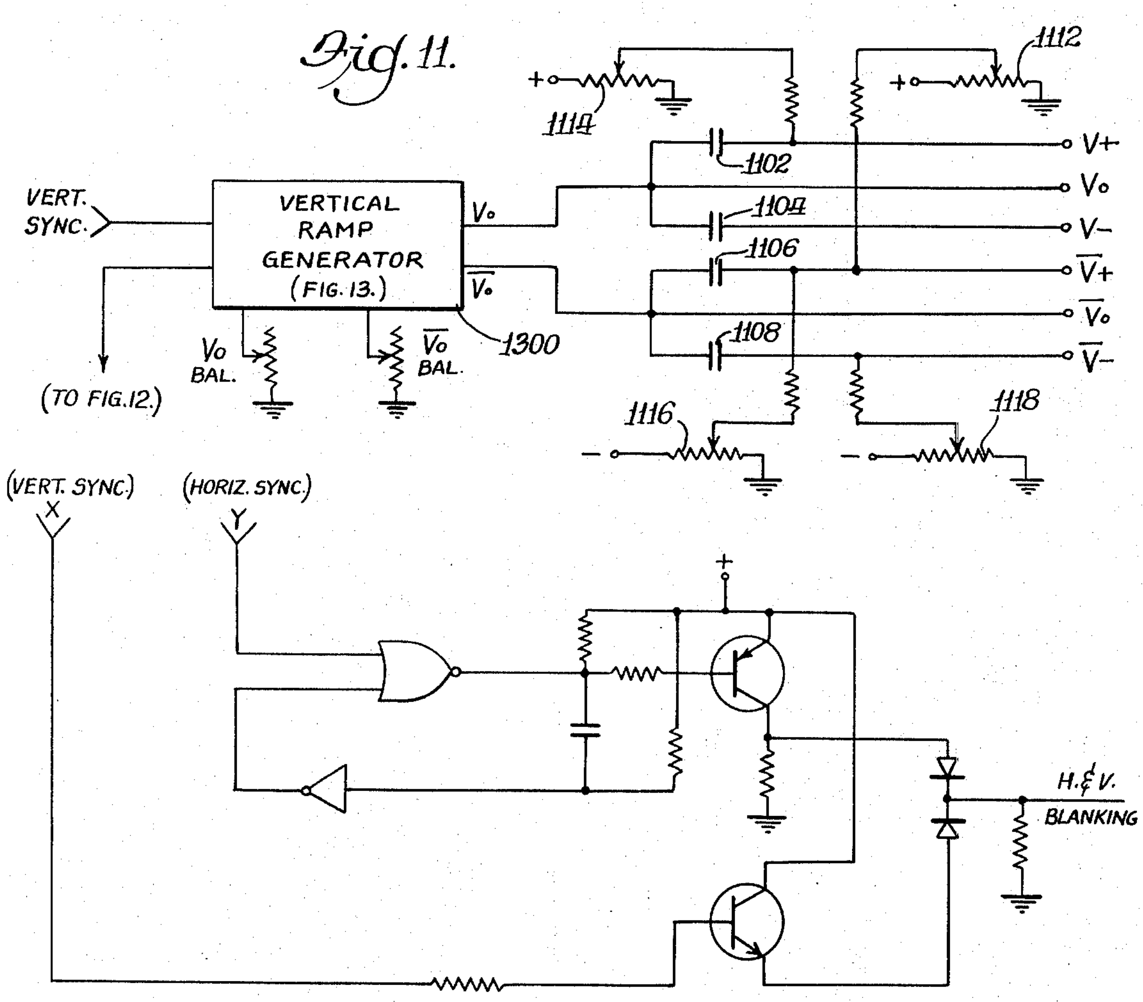
FIG. 11 illustrates how the vertical sawtooth waveforms shown in FIG. 6 are generated.
FIG. 12 is a circuit diagram of a blanking circuit which accepts signals from the circuits shown in FIGS. 10 and 11 and which generates a signal used to blank circuits shown in FIGS. 1 and 4 during synchronizing pulses and during the color burst interval.

The various waveforms hich may be used in different embodiments of the present invention are shown in FIG. 6. The basic waveforms $H_O$, $\bar{H}_O$, $V_O$, and $\bar{V}_O$ are generated by sawtooth generator circuits shown in FIGS. 13 and 14. With reference to FIGS. 10 and 11, these basic signals are passed through blocking capacitors 1002, 1004, 1006, 1008, 1102, 1104, 1106, and 1108 and are combined with varying levels of DC potential supplied by potentiometers 1012, 1014, 1016, 1018, 1112, 1114, 1116, and 1118 so as to form the waveforms H+, H−, $\bar{H}$+, $\bar{H}$−, V+, V−, $\bar{V}$+, and $\bar{V}$− as shown in FIG. 6. The preferred embodiment of the present invention includes means for generating all of these various signals and also switching means for intermixing these as required to produce any desired rotation special effect.

The wipe effect shown at 1941, 1942, and 1943 in FIG. 19 is executed in basically the same manner as the other wipe waveforms discussed above. This waveform causes one image to fan out or expand over another image in a rotational manner until the one image encompasses the entire picture. The circuitry shown in FIG. 4 is used to achieve this effect. The horizontal image separation line shown at 1941, 1942, and 1943 in FIG. 19 is produced by supplying the waveform $V_O$ to the comparator 406. The diagonal image separation line shown at 1941, 1942, and 1943 is achieved by connecting the slider A of the potentiometer 202 (FIG. 2) to the comparator 404 and by connecting the terminals B, C and D of the potentiometer 202 respectively to the waveforms $V_O$, $H_O$, and $\bar{V}_O$. The two video signals are then connected to pairs of the switches 422, 424, 426, and 428 rather than to individual switches, and the result is as shown at 1941, 1942, and 1943 in FIG. 19. Alternatively, four individual video signals may be used as shown in FIG. 4, in which case a wipe from two video images to two entirely different video images is achieved. If it is desired to have the wipe begin vertically rather than horizontally, or if the opposite direction of rotation is desired, then a different set of the waveforms shown in FIG. 6 are selected for application to the comparator 406 and to the potentiometer shown in FIG. 2. An example of this is disclosed in FIG. 18.

Figure 7:
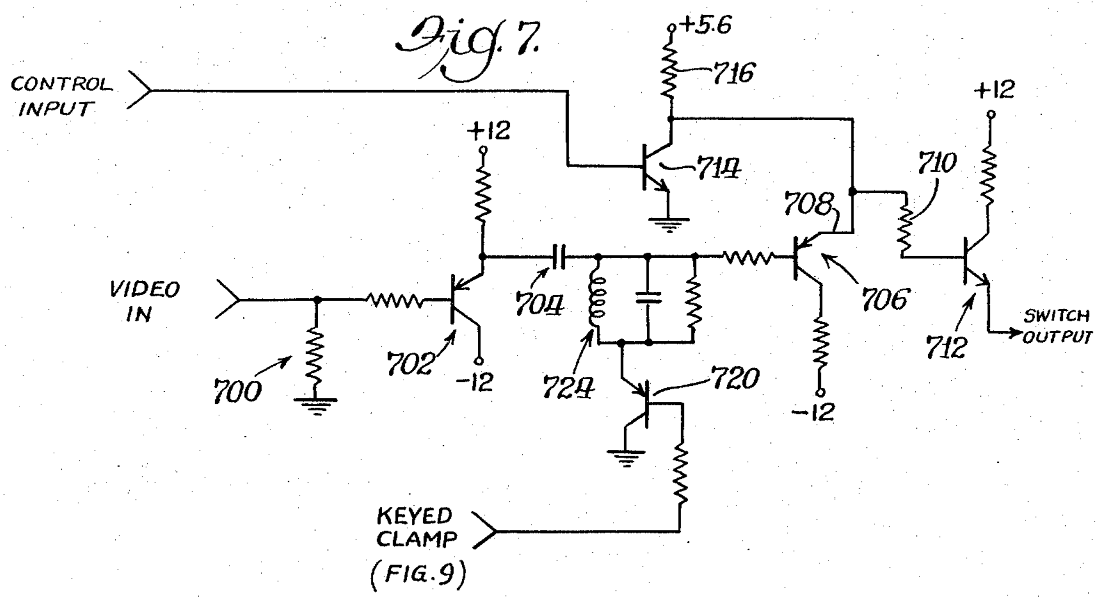
FIG. 7 is a schematic diagram of a video switch suitable for use in constructing the circuits shown in FIGS. 1 and 4.

A video switch 700 is illustrated in FIG. 7. The switch 700 is suitable for use in either FIG. 1 or FIG. 4 to function as switch 106, 108, 422, 424, 426, or 428. The video input signal to the switch 700 is first passed through an emitter follower transistor amplifier 702 and through an AC blocking capacitor 704 to a second emitter follower transistor amplifier 706. The emitter terminal 708 of the amplifier 706 is coupled by a resistor 710 to an emitter follower output transistor amplifier 712 which serves as the output of the switch 700. A switching transistor amplifier 714 connects the emitter 708 of the transistor amplifier 706 to ground, and a resistor 716 connects the same emitter 708 to an intermediate positive potential level.

The switch 700 is "closed" or conductive when no CONTROL INPUT signal is applied to the transistor 714. The transistor 714 is then non-conductive and the resistor 716 functions as the emitter resistor of the transistor amplifier 706. The emitter terminal 708 is then biased above ground, and this potential level is passed on through the output amplifier 712 to the switch output. When a CONTROL INPUT signal is applied to the transistor 714, the transistor 714 becomes conductive and connects the emitter terminal 708 of the amplifier 706 directly to ground. The output amplifier 712 attempts to follow this change in potential but is prevented from doing so by a positive bias which comes from another similar switch that is generating a positive level output signal. The transistor 712 then becomes non-conductive, and no video appears at the switch output.

Figure 8:
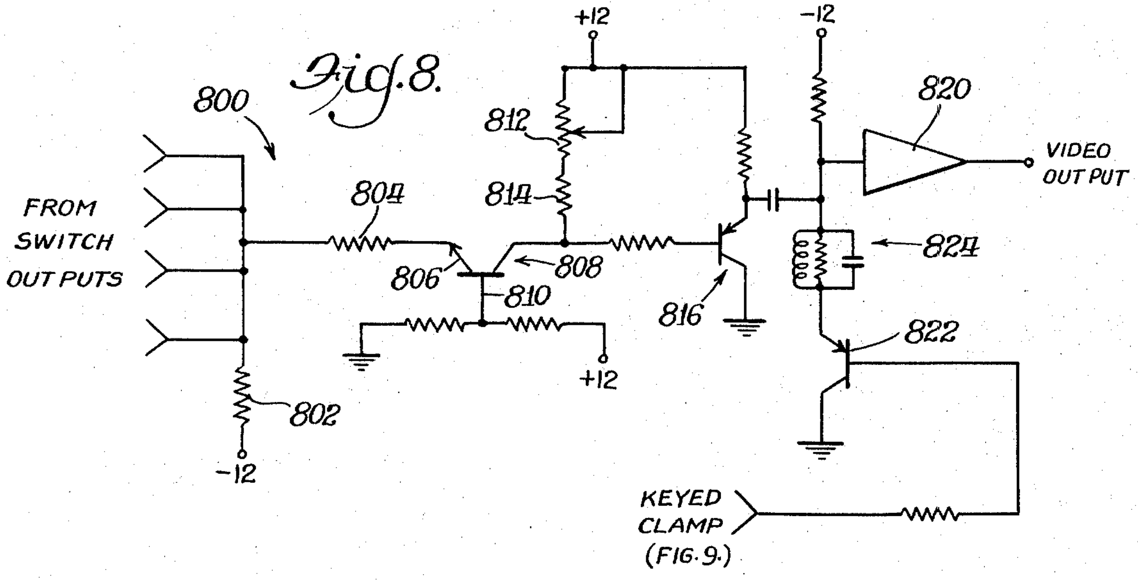
FIG. 8 is a schematic diagram of a video summer or adder suitable for use in constructing the circuits shown in FIGS. 1 and 4.

The summer 800 used to sum or to mix the switch outputs is shown in FIG. 8. The output signals from the various switches 700 are connected together and to a negative potential source through a resistor 802. The switch outputs are also connected by a resistor 804 to the emitter terminal 806 of a grounded-base transistor amplifier 808 having a base terminal 810 that is positively biased with respect to ground. The biasing of the input to the summer 800 is such that the emitter-base junctions of all transistors connecting to this input from the various switches 700 function as diodes and together form a type of OR gate in which the most positively biased input transistor amplifier 712 (FIG. 7) is the only one which is able to pass its video to the grounded-base transistor amplifier 808. The output of the amplifier 808 is developed across resistors 812 and 814, and the resistor 812 is made variable to allow an adjustment of the gain within the summer 800. An emitter follower transistor amplifier 816 transfers this signal through a DC blocking capacitor 818 to a video output amplifier 820.

Under normal operating conditions, only one of a plurality of switches 700 (FIG. 7) coupled to the summer 800 (FIG. 8) does not receive a CONTROL INPUT signal and has an output which is positively biased. This one switch circuit is the only one whose video signal is coupled into the grounded base transistor amplifier 808. The circuits shown in FIGS. 1 and 4 change the control inputs to the switches simultaneously and in a rapid manner, and hence the amount of transient induced by switching is minimal.

To insure that all of the switches 700 and the summer 800 are biased in the same manner and to insure that the black level of each video signal is clamped to precisely the same level, each of the switches 700 and the summer 800 is provided with a DC clamping transistor 720 (FIG. 7) and 822 (FIG. 8). During the "back porch" portion of each horizontal synchronizing pulse, at the time when the color burst signal is generated, all of the transistor switches 720 and 822 are rendered conductive by a KEYED CLAMP signal. This signal clamps the output of each switch 700 and of the summer 800 at precisely uniform levels for all signals which are handled so that operation of the special effects generator can be carried out without altering the basic DC brightness levels of the signals handled. Resistor dampened ringing circuits 724 and 824 are disposed between the shorting switches (720 and 822) and the terminals which they short to ground within the circuits 700 and 800. The ringing circuits 724 and 824 are tuned to the resonant frequency of the color burst signal. Since the ringing circuits are parallel tuned, they appear as an open circuit at the color burst signal and prevent the switches 720 and 822 from attenuating or otherwise affecting the color burst signal. The circuits 724 and 824 are intentionally dampened to prevent them from significantly affecting the phase of the color burst signal.

Figure 9:
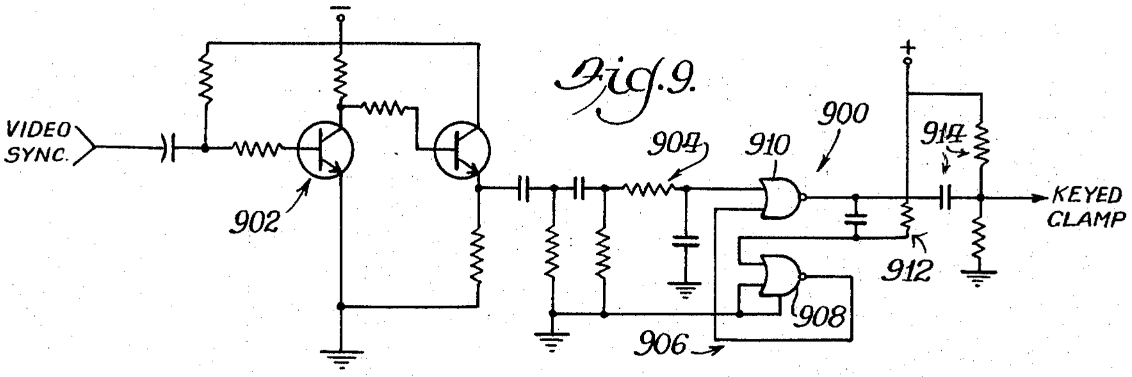
FIG. 9 is a schematic diagram of a delayed pulse generator used with the circuits in FIGS. 7 and 8 to equalize the black levels of all video signals which are mixed.

The KEYED CLAMP signal is generated by a circuit that is shown schematically in FIG. 9. Each horizontal synchronizing pulse is amplified by a transistor amplifier 902 and is passed through a simple R-C time delay network 904 to a simple one-shot multivibrator 906 that is constructed from a pair of cross-connected NOR gates 908 and 910. The time constant of the one-shot multivibrator 906 is determined by an R-C network 912 connected between the output of the gate 910 and an input to the gate 908. At the trailing edge of each horizontal sychronizing pulse, the amplifier 902 applies a negative pulse to the delay 904. After a brief interval, the delay network 904 triggers the multivibrator 906. The output of the one-shot multivibrator 906 goes negative and remains negative over the time inverval when the color burst signal appears. The multivibrator output is biased positively by circuit elements 914 and appears as a negative going KEYED CLAMP signal which goes from a normal level of around +4 volts to a clamping level of −1 volts and which periodically actuates the transistors 720 (FIG. 7) and 822 (FIG. 8).

It is undesirable to have any switching occur during times when synchronizing pulses are present in the video signals. Switching at such times could distort the synchronizing pulses and cause instability problems. To prevent this from happening, both the comparator 104 (FIG. 1) and the comparator 404 (FIG. 4) are arranged so that one input to the comparator may be biased during synchronizing pulse intervals in such a manner that the comparator output enables only one of the video signals to be fed into the VIDEO OUT signal regardless of the signal level present at the other input to the comparator. The waveform supplied to this alternate input of the comparators is essentially the horizontal and vertical synchronizing pulses combined by means of some form of OR gate. A suitable circuit for combining the horizontal and vertical synchronizing pulses appears in FIG. 12. The desired composite waveform appears at the output of an OR gate constructed from two diodes. One input to the OR gate is an amplified version of a vertical synchronizing pulse signal that is labeled X. The other input to the OR gate is essentially an amplified version of a horizontal synchronizing pulse that is labeled Y. The horizontal synchronizing pulse is passed through a monostable multivibrator. The multivibrator lengthens the horizontal pulse so that the comparators are biased during the time when the color burst signal appears as well as during the horizontal synchronization pulse interval.

Figure 13:
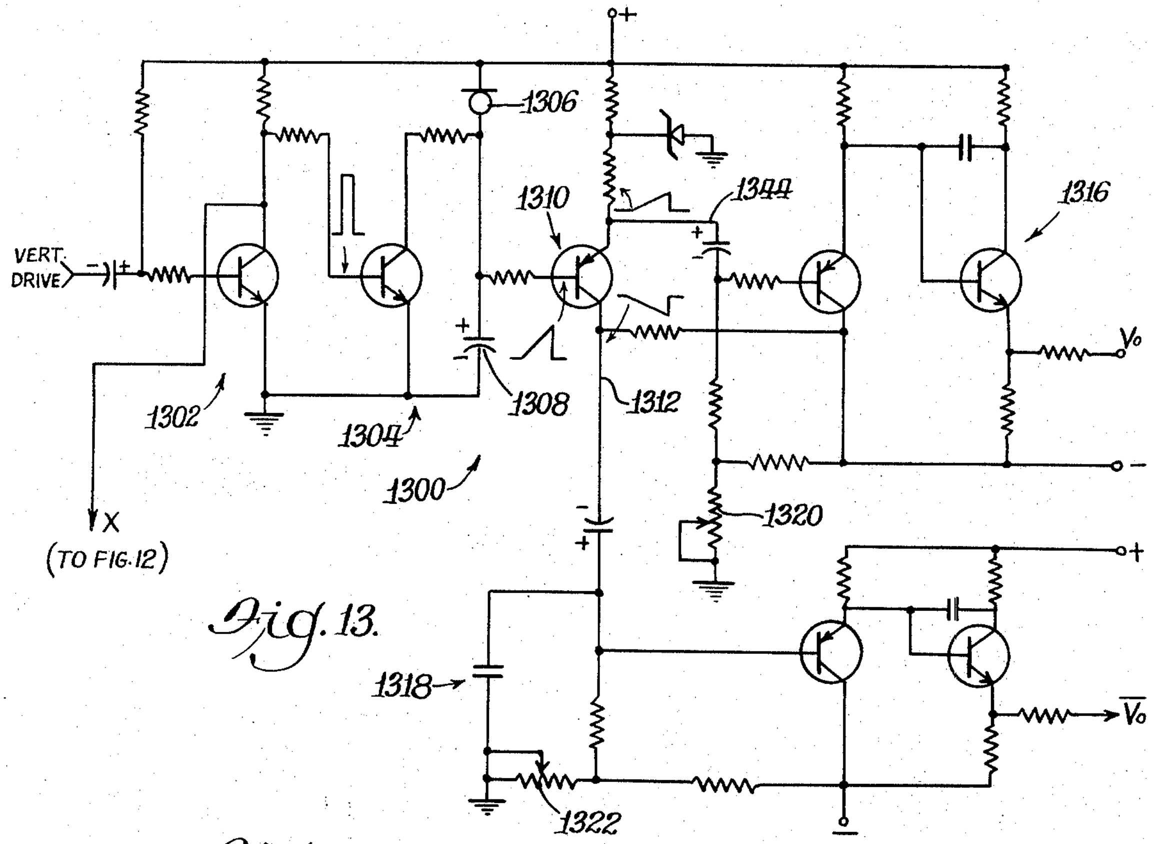
FIG. 13 is a schematic diagram of the vertical sawtooth generator shown diagrammatically in FIG. 11.
Figure 14:
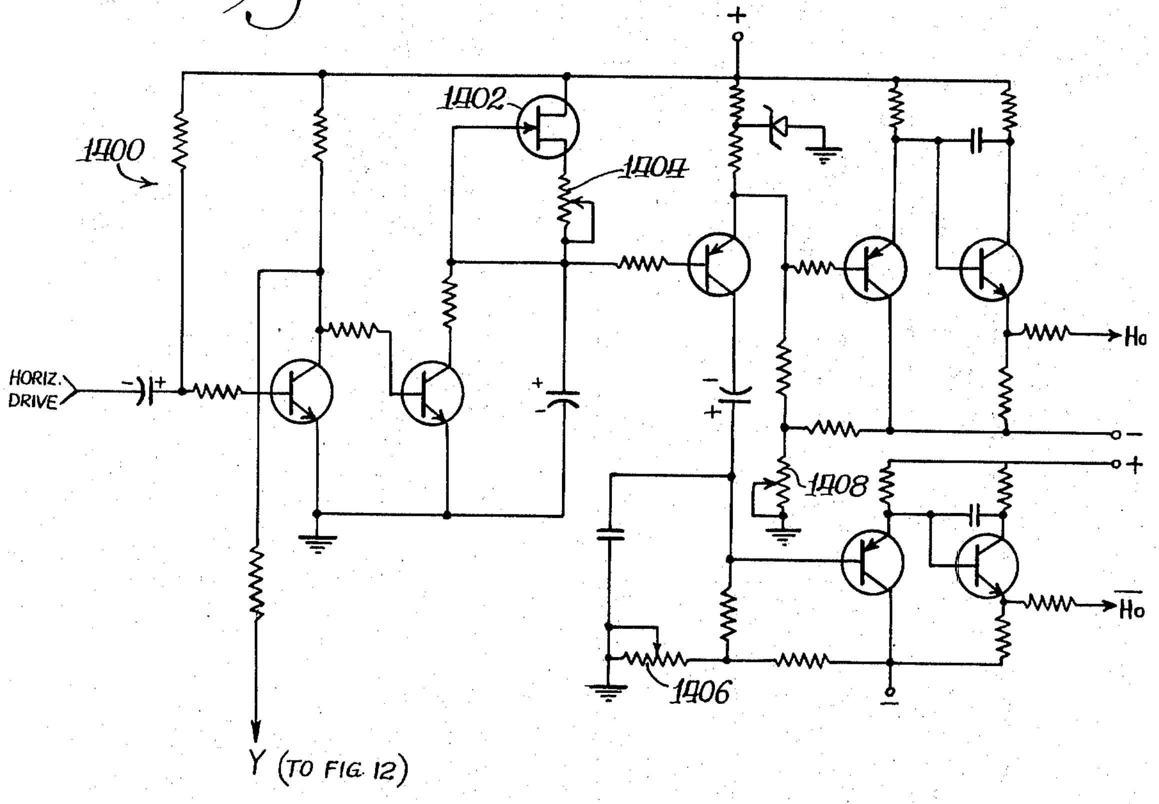
FIG. 14 is a schematic diagram of the horizontal sawtooth generator shown diagramatically in FIG. 10.

The specific circuits 1300 and 1400 used to generate the basic waveforms $V_0$ and $H_0$ are illustrated in FIGS. 13 and 14. These two circuits are essentially identical to one another. With reference to FIG. 13, vertical drive synchronizing pulses are amplified and clipped by a first inverting amplifier 1302 and are applied to a discharge transistor 1304. Each time a vertical drive pulse occurs, the discharge transistor 1304 discharges a capacitor 1308. Between successive vertical drive pulses, a constant current diode 1306 linearly charges the capacitor 1308 and thus generates a linear sawtooth waveform. The waveform is applied to the input of a transistor amplifier 1310. The amplifier 1310 has approximately equal loads connected in series with its emitter and its collector and therefore generates a first non-inverted sawtooth waveform at its emitter 1344 and a second inverted sawtooth waveform at its collector 1312. The two waveforms are passed through AC coupling capacitors to two output amplifiers 1316 and 1318 each of which includes an adjustment 1320 and 1322 for adjusting the DC component of the output waveform to zero or as desired. The adjustments 1320 and 1322 are used to center the resultant sawtooth waveforms $V_0$ and $\overline{V}_0$ as shown in FIG. 6.

With reference to FIG. 14, the circuitry used to generate the horizontal sawtooth waveforms $H_0$ and $\overline{H}_0$ are shown. In most respects, the circuit 1400 is identical to the circuit 1300. In place of the constant current diode 1306, the circuit 1400 uses an equivalent constant current source constructed from a field effect transistor 1402 and an adjustable resistor 1404. The circuit 1400 includes adjustments 1406 and 1408 for setting the DC value of the waveforms $H_0$ and $\overline{H}_0$.

The signals X and Y which are required by the blanking circuit shown in FIG. 12 are extracted from the circuits 1300 and 1400 at the output of the first stage of amplification within these circuits, as is shown in FIGS. 13 and 14.

The preferred embodiment of the invention is shown in block diagram form in FIG. 15. This preferred embodiment is capable of generating any of the special effects discussed above at the touch of a push button switch. A suitable front panel for the preferred embodiment of the invention is shown in FIG. 20. An illuminated square push button is provided for each possible special effect which may be generated. Each push button includes a simple diagram indicating the effect which is achieved when that particular push button is depressed. The front panel includes both a "joy stick" wipe control for controlling the execution of wipes and also a rotary potentiometer control for producing special circular effects. The push buttons are shown grouped adjacent the control to which they relate.

Figure 5:
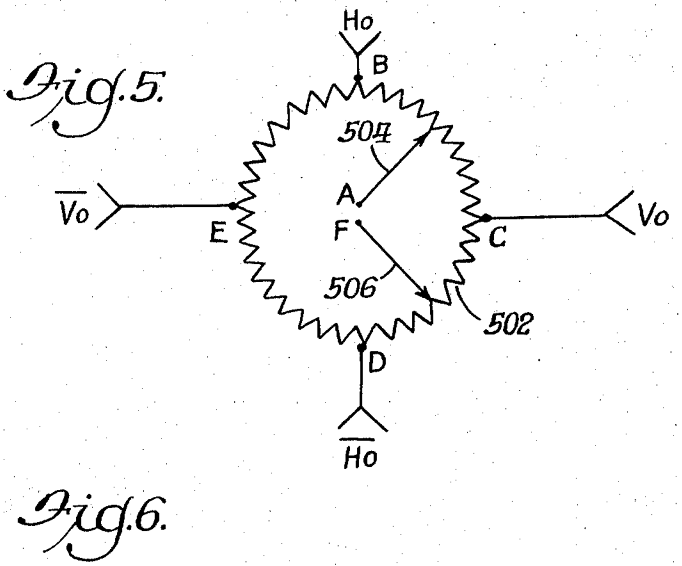
FIG. 5 is a 360° potentiometer designed for use with the circuitry shown in FIG. 4.

With reference to FIG. 15, the preferred embodiment of the invention includes a rotary potentiometer such as that shown in FIG. 5, a wipe control 1504 the slider of which is controlled by the joy stick shown in FIG. 20, an array of selector push buttons 1600, a switching matrix 1800 which is controlled by the push buttons 1600, and a switching unit such as that shown in FIG. 4. The rotary potentiometer and the switching matrix are supplied with the necessary waveforms for producing any desired special effect, and each waveform is shown in FIG. 6. The wipe control 1504 is supplied with a variable amount of DC potential by a potentiometer 1502. A fader voltage is developed by the control 1504 and is supplied to the switching matrix 1800. The wipe control 1504 is also equipped with a limit switch 1506 that supplies a ground level signal to the switching matrix 1800 for reasons which are explained more fully below. When one of the push buttons 1600 is depressed, the switching matrix 1800 either transfers the signals from the rotary potentiometer directly to the switching unit or else uses the fader voltage from the wipe control 1504 to supply appropriate amounts of the various incoming waveforms to the switching unit as required to produce any desired special effect.

Figure 16:
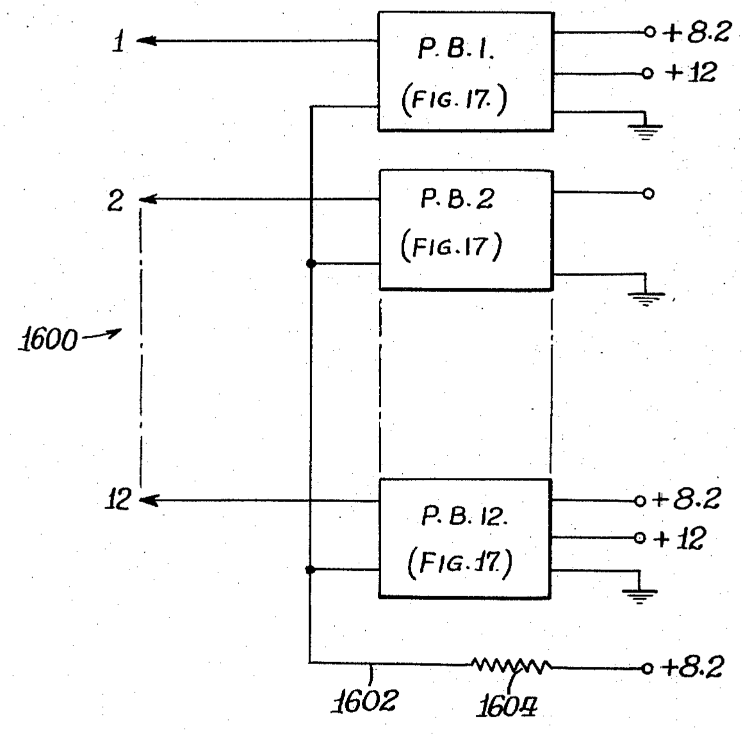
FIG. 16 is a block diagram of the selector push buttons used in FIG. 15.

FIG. 16 shows in block diagram form the push buttons 1600. Each of the push buttons is supplied with power from a 12-volt supply and from an 8.2-volt supply and generates a numbered output signal. A line 1602 interconnects the push buttons and is connected by a resistor 1604 to the 8.2-volt supply. When any pushbutton within the array 1600 is depressed, the push button generates a ground level output signal on its numbered output line and also supplies a signal to the line 1602 which causes all other push buttons to generate positive level output signals. In this manner, no more than one push button is ever supplying a ground level signal at any one time.

Figure 17:
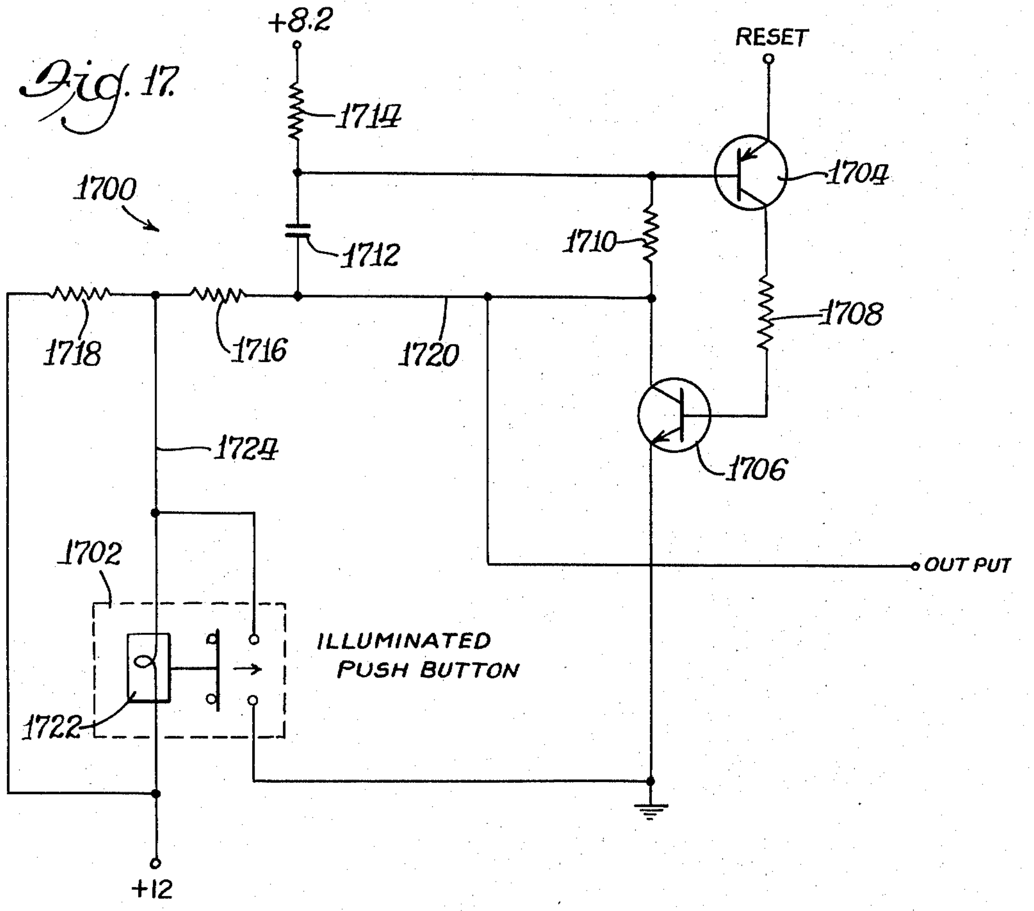
FIG. 17 is a schematic diagram showing the details of a typical selector push button as shown in FIG. 16.

The details of a typical push button 1700 are shown in FIG. 17. The push button 1700 includes an illuminated push button switch 1702 which includes a pair of contacts and a source of illumination 1722. Also included within the push button 1700 is a bistable or flip-flop circuit comprising two transistors 1704 and 1706 which have their respective collectors and bases interconnected by resistors 1708 and 1710. Under normal circumstances, both of the transistors 1704 and 1706 are biased into non-conduction. The transistor 1704 is held non-conductive by a positive bias which flows to the base of the transistor 1704 through resistors 1718, 1716, and 1710. The emitter of the transistor 1704 is connected to the reset line 1602 (FIG. 16) and is thus connected to a supply of roughly 8 volts. A resistor 1714 also connects the base of the transistor 1704 to the same 8-volt supply. Since the transistor 1704 is non-conductive, no current flows through the resistor 1708 to the base of the transistor 1706, and the transistor 1706 is kept non-conductive.

When the push button switch 1702 is manually actuated, a node 1724 is connected to ground. Current flows from ground, through resistors 1716 and 1710 and into the base of the transistor 1704 causing the transistor 1704 to conduct. Current from the transistor 1704 collector then flows through the resistor 1708 to the base of the transistor 1706 and causes the transistor 1706 to conduct. The transistor 1706 clamps the node 1702 to ground and thus creates a new current path through the resistor 1710 over which current may flow from ground to the base of the transistor 1704. The node 1720, which previously presented a signal level that was somewhere between 8 and 12 volts positive of ground, is now clamped to ground potential by the transistor 1706. This node 1720 serves as an output for the push button 1700. Hence, the output signal developed by the circuit 1700 is a ground level signal. Current flow through the collector of the transistor 1706 also flows through the resistor 1716 and the lamp 1722, thus illuminating the lamp 1722.

When the push button 1700 switches from generating a positive level output to generating a ground level output, a negative-going transient is momentarily applied to the reset line 1602 (FIG. 16). This transient is caused by a capacitor 1712 (FIG. 17). Prior to actuation of the push button switch 1702, the capacitor 1712 is biased so that the end of the capacitor connecting to the node 1720 is positively biased with respect to the opposite end of the capacitor 1712. When the push button switch 1702 is actuated, the transistor 1706 becomes conductive and forces the node 1720 towards ground potential. The capacitor 1702 cannot discharge instantaneously and therefore pulls the emitter of the transistor 1704 to a potential that is as far towards ground as is possible without reversing or stopping the current flow through the resistor 1708. The transistor 1704 functions as an emitter follower and applies the negative-going transient to the terminal labeled RESET that connects to the line 1602. In this manner, th line 1602 (FIG. 16) is supplied with a negative-going transient by a low impedance, emitter-follower transistor amplifier each time the push button switch 1702 is actuated.

In response to this negative-going transient on the line 1602, any push button 1700 generating ground level output signal is forced to generate a high level output signal. The negative transient is applied to the emitter of the transistor 1704. The base of the transistor 1704 is held at a fixed potential with respect to ground by the capacitor 1712. Hence, the negative transient at the emitter of the transistor 1704 renders the transistor 1704 momentarily non-conductive. Current flow through the resistor 1708 ceases, and the transistor 1706 also becomes non-conductive. The biasing circuit comprising the resistors 1714, 1710, 1716, and 1718 immediately re-applies a positive bias to the base of the transistor 1704 and thus holds both the transistors 1704 and 1706 in non-conductive states even after the transient terminates and the capacitor 1712 has reached an equilibrium charge level. The potential developed across the lamp 1722 is reduced to a point where the lamp 1722 is no longer illuminated. Hence, when a negative-going pulse is applied to the line 1602, all circuits 1700 except the circuit which generated the pulse are forced to generate a positive level output.

The details of the switching matrix 1800 are disclosed in FIGS. 18A and 18B. The waveform shown in FIG. 6 are fed into FIG. 18A from the left-hand edge of the figure. The switching signals generated by the push buttons 1600 are fed into FIG. 18B from the upper right-hand edge of the figure. The two signals A and F generated by the rotary potentiometer (FIG. 5) are fed into the lower right-hand corner of FIG. 18B on the lines labeled 1860 and 1858. The switching matrix output signals A and F leave FIG. 18B on lines 1862 to 1864 and head for the switching unit shown in FIG. 4.

The switching unit 1800 uses field effect transistor switches 1875 (FIG. 18A) to intermix the waveforms shown in FIG. 6 in any desired manner so as to produce any desired special effect. The switches 1875 couple the incoming waveforms H+, $H_0$, . . . to the four lines 1866, 1868, 1870 and 1872. Each of the switches 1875 connects an incoming waveform to one of the four lines mentioned above. Each of the switches 1875 includes a gate electrode that is normally biased for non-conduction of the switch by a resistive interconnection with a positive bias line 1874. A particular special effect or fade is established by driving the gate electrodes of selected gates 1875 negative, thereby connecting a particular pattern of the incoming waveforms to the four lines 1866, 1868, 1870 and 1872. Each of these four lines is terminated by a unity gain, emitter-follower transistor amplifier 1850, 1848, 1844, and 1846. Hence, the signals which are to be used in producing any particular special effect appear at the emitter electrodes of these four transistor amplifiers. In the case of wipes, the FADER VOLTAGE generated by the wipe control 1504 (FIG. 15) enters FIG. 18B from the right and is used to control the precise mixture of the signals appearing at the emitters of the amplifiers 1850, 1848, 1844, and 1846 which is supplied to each of the comparators shown in FIG. 4 over the lines 1862 and 1864.

The signal lines from the push buttons 1600 enter FIG. 18B from the upper right and are connected by serially connected Zener diodes 1878 and resistors 1882 to a source of negative bias 1880. All of these lines except for one are biased positively, and hence the junctions between the Zener diodes and the resistors for all of these inputs save one are also biased positively. The one push button signal line that supplies a ground potential signal allows the junction between the corresponding Zener diode and resistor to go negative. This negative bias is transferred by a diode array 1876 (FIGS. 18A and 18B) to the gates of the switches 1875 and also to additional switches shown in the lower half of FIG. 18B. The switches in the lower half of FIG. 18B determine what gross function is carried out. If the gross function is a wipe, then the switches 1875 shown in FIG. 18A determine the details of the wipe that is actually carried out.

Rotary special effects are achieved when either of the push button signal lines 11 or 12 is at ground potential. A ground level signal from either of these lines causes a switch 1836 to connect one slider F of the rotary potentiometer (FIG. 5) to one of the comparators within the switching unit (FIG. 4). Depending on which of the lines 11 or 12 is energized, another switch 1840 connects the line 1864 which goes to the other comparator within the switching unit (FIG. 4) either to the other slider of the rotary potentiometer (FIG. 5) over a line 1860 or else to a DC potential 1852 through a switch 1842. The resultant special effects are controlled by the rotary potentiometer and are shown in the upper half of FIG. 19 at 1921–23 and at 1931–33.

A ground level signal on any of the push button switching lines one to ten programs the switching matrix 1800 to produce any one of ten different types of wipes such as those illustrated at 1941–43, 1951–53, and at 1961–63 in FIG. 19. Signals on the push button signal lines 3 and 10 cause a composite signal to be formed by summing the outputs presented by the three amplifiers 1850, 1848, and 1844 at the base of an emitter-follower transistor amplifier 1812. The emitter output of the amplifier 1812 passes through switching circuits 1838 and 1836 to the line 1862 and ultimately to the input terminal of a comparator within the switching unit (FIG. 4). The lead 1864 which connects to the second comparator within the switching unit (FIG. 4) is connected by the switches 1840 and 1842 to a negative DC potential source 1852. Hence, the second comparator is biased out of operation when one of the push button signal lines 3 to 10 goes to ground.

The push button signal lines 3 to 6 produce 90° rotational wipes about a center of rotation located in one of the four corners of the video image, as illustrated at 1961, 1962, and 1963 in FIG. 19. The push button signal lines 7 to 10 produce 180° wipes about a center of wipe rotation located at the center of one edge of the video image, as illustrated at 1951, 1952, and 1953 in FIG. 19. Since a 90° wipe only requires two signals to be mixed, only two of the switches 1875 are used. A first switch connects an input signal H+, $H_0$, . . . to the line 1866, and a second switch connects an input signal to the line 1870. In the case of a 180° wipe, a third switch is used to connect an additional signal to the line 1868.

If a rotational wipe from one video image to another about the center of a video image is desired, as shown at 1941, 1942, and 1943 in FIG. 19, one of the push button signal lines 1 or 2 is actuated. In addition to causing signals to be supplied to the lines 1866, 1868, and 1870 as required for any 180° wipe, a ground level signal on line 1 or 2 also causes an additional switch to supply a signal to the fourth line 1872. The line 1872 is connected by the emitter-follower transistor amplifier 1846 and by switches 1842 and 1840 to the output 1864 which connects to the second comparator within the switching unit (FIG. 4). Hence, both of the comparators within the switching unit (FIG. 4) are used for wipes when rotation is about the center of the picture. When such wipes are to be produced, it is necessary to supply each of the signals which are to be included in the wipe effect to two of the four video inputs to the switching unit (FIG. 4).

As examples of how the switching matrix 1800 operates, assume first that a ground level signal is applied to the push button signal line number 1 (FIG. 18B). A negative level signal is developed on a line 1884. This negative level signal is applied to the gates of the switches 1842, 1887, 1889, 1891, and 1893 by diodes 1885, 1886, 1888, 1890 and 1892. The switches cause the waveforms $H_0$, $V_0$, and $\overline{H}_0$ to be applied to the respective lines 1866, 1868, and 1870; and also cause the waveform $H_0$ to be applied to the line 1872. The switches 1842 and 1840 connect the waveform $H_0$ (line 1872) to one comparator over the line 1864. A waveform summing circuit (which has not yet been described) mixes the waveforms $H_0$, $V_0$, and $\overline{H}_0$ under the control of the FADER VOLTAGE signal and applies the mixture of waveforms to the other comparator over the line 1862. The matrix 1800 is now set up to perform a center-rotational wipe between two signals, much like the wipe illustrated at 1941, 1942, and 1943 in FIG. 19. Assume next that a ground level signal is applied to the push button signal line number 4 (FIG. 18B). A negative level signal is developed on a line 1894. This negative level signal is applied to the gates of the switches 1897 and 1898 by diodes 1895 and 1896. The two switches cause the waveforms V− and $\overline{H}$+ to be applied to the respective lines 1866 and 1870. The two signals are mixed under the control of a waveform summing circuit (not yet described) and are sent to a comparator over the line 1862. The switch 1842 is not actuated and connects the second comparator line 1864 to a fixed potential 1852, thus placing the second comparator out of service. The matrix 1800 is now set up to perform a 90° corner wipe between two signals, much like the wipe illustrated at 1961, 1962, and 1963 in FIG. 19. All other functions are established in an analogous manner. The details of the interconnections required to produce any particular effect may bs ascertained by studying the diode matrix 1876 shown in FIGS. 18A and 18B.

The switching matrix 1800 sums signals presented by the switches 1875 in a different manner than has heretofore been mentioned. Rather than applying the signals to the ends of a potentiometer or potentiometer segment (see, for example, the potentiometers in FIGS. 1 and 2), the mixing of signals is carried out by modules 1802, 1804, and 1806 each of which contains a light sensitive resistor and a source of illumination or a lamp. The resistors within the modules 1802, 1804, and 1806 are normally non-conductive, but they become increasingly conductive when exposed to increasingly bright levels of illumination. By energizing and de-energizing the lamps within the units 1802, 1804, and 1806 in the proper squence, it is possible to selectively mix the three signals presented by the transistor amplifiers 1850, 1848, and 1844.

In order to simulate the effect of a potentiometer having a center tap as shown in FIG. 2, it is necessary to de-energize and to energize the lamps within the units 1802, 1804, and 1806 sequentially. For example, if the lamp 1802 is initially energized, the first operation is to de-energize the lamp 1802 while simultaneously energizing the lamp 1804; the second operation is to de-energize the lamp 1804 while simultaneously energizing the lamp 1806.

The energization and de-energization of the lamps within the units 1802, 1804, and 1806 is carried out under the control of the FADER VOLTAGE signal generated by the wipe control 1504 (FIG. 15). The FADER VOLTAGE signal enters FIG. 18B from the right-hand edge of the figure and is applied directly to the lamp within the unit 1802 by an emitter-follower transistor amplifier 1808 having an input resistor 1820. The FADER VOLTAGE signal is also applied by a resistor 1826 to the inverting input of an operational amplifier 1828. The output of the amplifier 1828 is sent back to the same input through a resistor 1824. The resistances of the two resistors 1824 and 1826 are equal, and for this reason the amplifier 1828 functions as a unity-gain inverting amplifier and generates an inverted FADER VOLTAGE signal. The inverted FADER VOLTAGE signal is applied to the lamp within the unit 1806 by an emitter-follower transistor amplifier 1834 having an input resistor 1832. As the FADER VOLTAGE signal falls, the lamp within the unit 1802 becomes dim; simultaneously, the inverted FADER VOLTAGE signal rises and the lamp within the unit 1806 becomes bright. The resistance of the photoresistors change accordingly, and the signal applied to the transistor amplifier 1812 gradually shifts from a direct connection to the output of the amplifier 1850 to a direct connection to the output of the amplifier 1844. For simple 90° fades (such as at 1961–1963 in FIG. 19), this is all the circuitry that is required to produce a complete fade between two signals.

In the case of 180° fades, a third signal must also be added through operation of the unit 1804. A lamp within the unit 1804 is relatively dark when the FADER VOLTAGE signal is either high or low but becomes illuminated when the FADER VOLTAGE signal is at an imtermediate level. Energization for the lamp within the unit 1804 comes from an emitter-follower transistor amplifier 1810. The amplifier 1810 is either coupled directly to the FADER VOLTAGE signal by an emitter-follower transistor amplifier 1814 or else is coupled directly to the inverted FADER VOLTAGE signal by an emitter-follower transistor amplifier 1816. The two transistors 1814 and 1816 are of the PNP variety. The emitter-base junctions of these two transistors together form an OR gate that couples the base of the transistor 1810 to the signal that is the more negative of the FADER VOLTAGE and the inverted FADER VOLTAGE signals. For example, if the FADER VOLTAGE signal is more negative than the inverted FADER VOLTAGE signal (the output of the amplifier 1828), the emitter-base junction of the transistor 1814 is forward-biased and pulls the common-emitter load resistor 1818 far enough negative to bias the transistor 1816 emitter-base junction fully non-conductive. The emitter-base junction of the transistor 1816 then becomes an open circuit, and the lamp within the unit 1804 follows the FADER VOLTAGE signal only.

To understand how this circuitry controls the operation of the unit 1804, assume that the FADER VOLTAGE signal is initially negative and swings slowly towards ground potential. Since the non-inverting input of the amplifier 1828 is biased negatively by a network 1830, the inverted FADER VOLTAGE signal simultaneously swings slowly away from ground level in the negative direction. Since the emitter-follower transistor amplifier 1810 is forced to follow the most negative of the FADER VOLTAGE and the inverted FADER VOLTAGE signals, the amplifier 1810 starts at a negative level, rises about half-way to ground potential, and then swings back in a negative direction again. The lamps within the units 1802, 1804, and 1806 are biased in such a manner that a ground level input to a lamp causes maximum illumination while a negative level input produces little or no illumination. Hence, as the FADER VOLTAGE signal swings towards ground potential, the lamp within the unit 1802 goes from complete darkness or from a very low level of illumination to a state of full illumination; the lamp within the unit 1806 goes from a state of full illumination to a state of little or no illumination; and the lamp within the unit 1804 begins and terminates in a state of little or no illumination but is partially illuminated when the FADER VOLTAGE signals are halfway through their swings. Since full voltage is never applied to the lamp within the unit 1804, it would seem at first that a signal presented by the transistor amplifier 1848 is never presented in full strength to the transistor amplifier 1812 by the unit 1804 and is always diluted somewhat by signals flowing through the units 1802 and 1806. Dilution does not occur because whenever a signal is present at the output of the transistor amplifier 1848, the units 1802 and 1806 are presenting sawtooth signals which are the reciprocal of one another ($H_0$ and $\overline{H}_0$; $V_0$ and $\overline{V}_0$; or some analogous combination). When the FADER VOLTAGE signals are halfway through their swings so as to balance the outputs of the units 1802 and 1806, these inverted representations of the same sawtooth effectively cancel one another out of existence and leave no other signal presented to the transistor amplifier 1812 except that which flows from the amplifier 1848. Hence, there is never any need to fully energize the lamp within the unit 1804.

The use of lamps and photoresistors to mix signals and to produce waveforms for presentation to the comparators within the switching unit (FIG. 4) is fully equivalent to the use of a potentiometer to mix signals and to produce waveforms. The circuitry used to drive the lamps adds somewhat to the circuit complexity, but the use of lamps and photoresistors have a number of advantages not offered by potentiometers. First of all, the wipe control generates nothing more than a DC voltage. It is therefore unnecessary to provide any shielding for the leads going to and from the wipe control. It is also unnecessary to concern oneself about the effects of stray capacity upon the leads to and from the wipe control. Use of illumination sources and photoresistor units makes it possible to mount the wipe control at any desired distance from the actual circuitry 1800 which handles the sawtooth waveforms. The use of an array of push buttons to generate DC potentials which control solid state switches allows the push buttons to be positioned any distance from the circuitry 1800 without there being any concern for the effects of stray capacity upon the high frequency waveforms. The switching unit 1800 may thus be mounted adjacent the video circuits which are to be switched, and the controls for the switching unit 1800 may be mounted in any convenient location no matter how far remote from the unit 1800 itself. The use of the switching units 1802, 1804, and 1806 makes it possible to achieve 180° wipes without the use of a center-tapped potentiometer, and allows the single control to be used to generate both 90° and 180° effects. It is also possible to replace the rotational potentiometer shown in FIG. 5 with an arrangement of photoresistors and lamps or with some other equivalent form of remotely controllable signal mixing circuitry.

With reference to FIG. 15, the wipe control 1504 has a limit switch 1506 that is actuated when the wipe control 1504 reaches one extreme end of its range. The limit switch 1506 generates a LIMIT signal with which passes over a line 1856 (FIG. 18B) and causes a switch 1838 to disconnect the comparator line 1862 from the output of the transistor amplifier 1812 and to connect this line instead to a fixed positive potential reference node 1854. The purpose of the limit switch 1506 (FIG. 15) becomes apparent when one considers what happens as one wipes from an image containing video signal B to an image containing video signal A. Assume that the blanking circuit shown in FIG. 12 biases the comparators within the switching unit (FIG. 4) in such a manner that during the generation of horizontal and vertical synchronizing pulses video signal B is always supplied to the switching unit video output. If a fade begins with the video output comprising 100 percent video signal B, the synchronizing pulses in the video come from the same source. At the end of a complete fade, the video output comprises video signal A plus the synchronizing pulses from video signal B. This happens because of the operation of the circuitry shown in FIG. 12. This is undesirable, since at the end of a fade it is better to have the synchronizing pulses coming from the same video signal which is being transmitted. When the wipe control 1504 is in such a position that video A is being transmitted along with video B synchronizing pulses, the limit switch 1506 (FIG. 15) causes the switch 1838 (FIG. 18B) to connect the input to the comparator within the switching unit (FIG. 4) to a potential that is far enough positive so that the effect of the waveforms supplied to the comparator by the circuitry shown in FIG. 12 is overcome and so that the synchronizing pulses from video signal B are presented along with video signal B, rather than the synchronizing pulses from video signal A.

While the preferred embodiments of the present invention have been described, it will be understood that numerous modifications and changes will occur to those who are skilled in the art. It is therefore intended by the appended claims to cover all such modifications and changes as come within the true spirit and scope of the present invention.

What is claimed as new and desired to be secured by Letters Patent of the United States is:

1. An apparatus for combining first and second incoming video signals so as to produce a composite video signal that produces a composite image containing portions of the incoming signals separated by straight-line boundaries which boundaries may be rotated, said apparatus comprising:

a source of one or more horizontal sawtooth waveforms;

a source of one or more vertical sawtooth waveforms;

signal mixing means coupled to said sources and having an output at which is presented a mixture of one horizontal sawtooth waveform with one vertical sawtooth waveform, said mixing means including externally operable control means for setting the proportions of the mixture and for determining which waveforms are included in the mixture;

comparator means having an input connected to the output of said mixing means for generating a binary output signal indicating whether the comparator means input signal is above or below a reference level; and video switching means into which the first and second incoming video signals are fed and out of which the composite video signal flows for switching between the incoming signals under the control of the output signals generated by the comparator means in such a manner that the first video signal becomes the composite video signal when the binary output signal is in one state and the second video signal becomes the composite output signal when the binary output signal is in the other state.

2. An apparatus in accordance with claim 1 wherein the signal mixing means comprises a potentiometer having one end terminal connected to a source of horizontal sawtooth waveform, having another end terminal connected to a source of vertical sawtooth waveform, and having a movable tap connecting to a comparator means input.

3. An apparatus in accordance with claim 1 wherein the signal mixing means comprises a potentiometer having end terminals connected between sources of normal and inverted sawtooth waveforms of one variety (horizontal or vertical), having a center tap terminal connected to a sawtooth waveform of the other variety, and having a movable tap connecting to a comparator means input.

4. An apparatus in accordance with claim 1 wherein the signal mixing means comprises a 360° rotational potentiometer having four fixed taps spaced at 90° intervals, wherein sources of normal and inverted horizontal sawtooth waveforms are connected respectively to a first tap and to a second tap positioned 180° from the first tap; wherein sources of normal and inverted vertical sawtooth waveforms are connected respectively to a third tap and to a fourth tap spaced 180° away from the third tap, and said potentiometer having a first movable tap which connects to a first comparator means input.

5. An apparatus in accordance with claim 1 wherein the signal mixing means comprises a 360° rotational potentiometer having four fixed taps spaced at 90° intervals, wherein sources of normal and inverted vertical sawtooth waveforms are connected respectively to a first tap and to a second tap positioned 180° from the first tap; wherein sources of normal and inverted vertical sawtooth waveforms are connected respectively to a third tap and to a fourth tap spaced 180° away from the third tap, and said potentiometer having a first movable tap which connects to a first comparator input and a second movable tap mounted 90° away from the first movable tap which connects to a second comparator input.

6. An apparatus in accordance with claim 1 wherein one or more of the waveforms generated by the sources include a substantial direct current component that shifts the center of rotation away from the center of the composite image towards an edge or corner of the composite image.

7. An apparatus in accordance with claim 1 wherein the signal mixing means mixes a horizontal waveform with a vertical waveform, and wherein biasing means are provided for effectively D.C. biasing the horizontal and vertical waveforms in opposite directions sufficiently so that the center about which rotation occurs is a corner of the video image, whereby a 90° corner wipe effect is achieved.

8. An apparatus in accordance with claim 1 wherein the signal mixing means includes control means which, when actuated in one direction, first mixes a waveform of one type (horizontal or vertical) with a waveform of the other type and then mixes the waveform of the other type with an inverted waveform of the one type, said mixing means presenting the waveform of one type to the comparator means when the control means is in one extreme position, said mixing means presenting the inverted waveform of the one type when the control means is in the other extreme position, and said mixing means presenting the waveform of the other type when said control means is halfway between the respective extreme positions, whereby a 180° rotation of a boundary is achieved.

9. An apparatus in accordance with claim 8 wherein the normal and inverted waveforms of the one type are DC biased to shift the center of rotation to the center of an edge of the composite image, thereby giving a 180° wipe effect.

10. An apparatus for combining two or more incoming video signals so as to produce a composite video signal that produces a composite image containing portions of the incoming signals separated by straight-line boundaries which boundaries may be rotated, said apparatus comprising:

a source of one or more horizontal sawtooth waveforms;

a source of one or more vertical sawtooth waveforms;

signal mixing means coupled to said sources and having at least two outputs to each of which are presented a mixture of one horizontal sawtooth waveform with one vertical sawtooth waveform, said mixing means including externally operable control means for setting the proportions of the mixture and for determining which waveforms are included in the mixture;

two comparators having respective inputs connected to the outputs of said mixing means and each generating binary output signals, wherein said two binary output signals when considered together have four possible states; and video switching means into which the video signals and binary output signals are fed and out of which the composite video signal flows, comprising means for supplying a particular one of the incoming signals as the composite video signal during each of the four possible states of the two binary output signals generated by the comparators.

11. An apparatus in accordance with claim 10 wherein four incoming signals are fed into the video switching means, a particular one of the four signals becoming the composite video signal during each of the four possible states of the binary output signals.

12. An apparatus for producing 90° rotational wipes between two video signals comprising:

sources of horizontal and of vertical sawtooth waveforms;

mixing means connecting to both said sources and having an output at which a mixture of said waveforms appear, the proportions of said waveforms present at said output varying linearly with the actuation of control means within the mixing means;

comparator means having an input connected to said mixing means output and having binary output;

signal switching means into which said two video signals and said binary output are fed, said signal switching means having an output at which appears one or the other of the video signals in accordance with the state of the binary signal.

13. An apparatus in accordance with claim 12 in which some of the waveforms are DC biased with respect to the comparator means.

14. An apparatus in accordance with claim 13 wherein the DC bias is adjusted to cause a 90° corner wipe effect.

15. An apparatus for producing 180° rotational wipes between two video signals comprising:

sources of horizontal and vertical sawtooth waveforms;

mixing means including externally actuatable control means having a first range corresponding to half of the control means motion during which a varying mixture of one type of waveform (horizontal or vertical) with the other type is produced at an output, the one type being produced when the control means is at one extreme end of its first range and the other type being produced when the control means is at the other extreme end of its first range and at the middle of its overall range; said control means having a second range corresponding to the reamining half of the control means motion during which a varying mixture of the other type of waveform with an inverted waveform of the one type is produced at the output, the inverted waveform of the one type being produced when the control means is at one extreme and of its second range and the other type being produced when the control means is at the other extreme end of its second range and at the middle of its overall range;

comparator means having an input connected to the mixing means output and generating an output control signal; and video switching means into which said two video signals and said output control signal are fed for switching between the two video signals under the control of the comparator means output control signal.

16. An apparatus in accordance with claim 15 in which some of the waveforms are DC biased with respect to the comparator means.

17. An apparatus in accordance with claim 15 wherein DC bias is applied to the one type of waveform and to the inverted waveform of the one type so as to produce a 180° wipe effect about the center of one edge of the resultant video image.

18. An apparatus for producing rotational special effects comprising:

sources of normal and inverted horizontal and vertical sawtooth waveforms;

mixing means connecting to all of said sources and including rotational control means for generating at least one output signal that at any given moment is a mixture of no more than one horizontal and one vertical waveform, said rotational control means causing every possible mixture of said horizontal with said vertical waveforms to be produced during each complete rotation of the control means, said output signals presenting in sequence a horizontal sawtooth waveform, a vertical sawtooth waveform, an inverted horizontal sawtooth waveform, and an inverted vertical sawtooth waveform, and said output signals presenting smoothly varying mixtures of the waveforms in between generations of the pure waveforms;

comparator means connected to each output of said mixing means and generating one or more switching control signals; and video switching means controlled by the switching control signals.

19. An apparatus in accordance with claim 18 wherein the mixing means is a 360° rotary potentiometer having taps at 90° intervals connected in sequence to the horizontal, vertical, inverted horizontal, and inverted vertical waveforms and having at least one slider connecting to comparator means and supplying an output signal to the comparator means.

20. An apparatus in accordance with claim 18 wherein the potentiometer has two sliders mounted 90° from one another each generating an output signal for each of two comparator means, wherein the comparator means generate switching signals having four states, and wherein the video switching means passes a predetermined one of two or more video signals for each of the four states.

21. In a special effects generator including video switching means controlled by comparators having inputs connected to sawtooth waveforms, an apparatus for preventing switching from occurring during the transmission of synchronizing pulses, said apparatus comprising:

logical OR means for combining horizontal and vertical synchronizing pulses into a single waveform;

a disable input terminal to each comparator for forcing the comparator output to a predetermined state when a signal is supplied to said disable input; and circuit means connecting the single waveform generated by the logical OR means to the comparator disable input terminals.

22. An apparatus in accordance with claim 21 wherein the disable input to the comparators is a comparator input that is normally held at a fixed potential while another comparator input is supplied with sawtooth waveforms.

23. An apparatus in accordance with claim 21 and further including one-shot multivibrator means for extending the length of horizontal synchronizing pulses to encompass the color burst signal as well as the horizontal synchronizing pulses.

* * * * *